United States Patent
Tabuchi et al.

(10) Patent No.: US 6,810,167 B2
(45) Date of Patent: Oct. 26, 2004

(54) WAVELENGTH DIVISION DEMULTIPLEXING APPARATUS

(75) Inventors: Haruhiko Tabuchi, Kawasaki (JP); Terukazu Naruse, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 313 days.

(21) Appl. No.: 10/102,897

(22) Filed: Mar. 22, 2002

(65) Prior Publication Data

US 2003/0081898 A1 May 1, 2003

(30) Foreign Application Priority Data

Oct. 29, 2001 (JP) ........................................ 2001-331624

(51) Int. Cl.[7] .............................. G02B 6/26; H04J 14/02
(52) U.S. Cl. ............................ 385/24; 385/37; 385/42; 385/129; 385/130; 385/132; 385/43; 385/45; 398/82; 398/87
(58) Field of Search ............................ 385/24, 37, 42, 385/43, 45, 129, 130, 131, 132; 298/79, 82, 87

(56) References Cited

U.S. PATENT DOCUMENTS

| | | | |
|---|---|---|---|
| 5,559,906 A | | 9/1996 | Maerz .......................... 385/37 |
| 5,706,377 A | | 1/1998 | Li ................................ 385/37 |
| 5,838,849 A | | 11/1998 | Shirasaki ...................... 385/31 |
| 5,940,555 A | * | 8/1999 | Inaba et al. .................. 385/24 |
| 6,069,990 A | * | 5/2000 | Okawa et al. ................ 385/43 |
| 6,222,956 B1 | * | 4/2001 | Akiba et al. .................. 385/24 |
| 6,418,249 B1 | * | 7/2002 | Nakamura et al. ............ 385/24 |
| 2002/0181871 A1 | * | 12/2002 | Saito et al. ................... 385/37 |
| 2003/0091289 A1 | * | 5/2003 | Saito et al. ................... 385/49 |
| 2003/0123831 A1 | * | 7/2003 | Nakagawa et al. ......... 385/132 |
| 2003/0228104 A1 | * | 12/2003 | Tabuchi ........................ 385/37 |

FOREIGN PATENT DOCUMENTS

| | | | |
|---|---|---|---|
| EP | 0 493 132 A1 | 1/1992 | ............... 385/42 X |
| GB | 2 367 381 A | 3/2002 | ............... 385/37 X |
| JP | 11-002733 | 1/1999 | ............ G02B/6/12 |
| JP | 11-064657 | 3/1999 | ........... G02B/6/122 |
| JP | 11-160555 | 6/1999 | ............ G02B/6/12 |
| JP | 11-218624 | 8/1999 | ............ G02B/6/12 |
| JP | 2000-206351 | 7/2000 | ........... G02B/6/122 |
| JP | 2001-100059 | 4/2001 | ............ G02B/6/30 |
| JP | 2001-141944 | 5/2001 | ............ G02B/6/12 |
| JP | 3274058 | 2/2002 | |

OTHER PUBLICATIONS

Search Report, UK Patent Application No. 0207741.0, issued Aug. 15, 2002 in counterpart application.

Smit, Meint K., et al., "PHASAR–Based WDM–Devices : Principles, Design and Applications," IEEE Journal of Selected Topics in Quantum Electronics, vol. 2, No. 2, Jun. 1996, pp. 236–250.

Kato, Kazutoshi, et al., "A High–Efficiency 50 GHz InGaAs Multimode Waveguide Photodetector," IEEE Journal of Quantum Electronics, vol. 28, No. 12, Dec. 1992, pp. 2728–2735.

* cited by examiner

Primary Examiner—Brian M. Healy
(74) Attorney, Agent, or Firm—Staas & Halsey LLP

(57) ABSTRACT

The invention provides a wavelength division demultiplexing apparatus which can reduce the connection loss between an input slab and channel waveguides and can suppress excitation of higher-order mode light to reduce the loss. The apparatus includes a first waveguide for propagating WDM light, a first slab for diffusing the light from the first waveguide, a plurality of channel waveguides having a series of different waveguide lengths with a predetermined difference for receiving and splitting the light from the first slab, a second slab for condensing the split light from the channel waveguides, and a second waveguide for propagating the light from the second slab therein, all formed on a subtrate. The channel waveguides and the first slab are optically connected to each other at a number of nodes greater than the number of nodes at which the channel waveguides and the second slab are connected to each other.

39 Claims, 35 Drawing Sheets

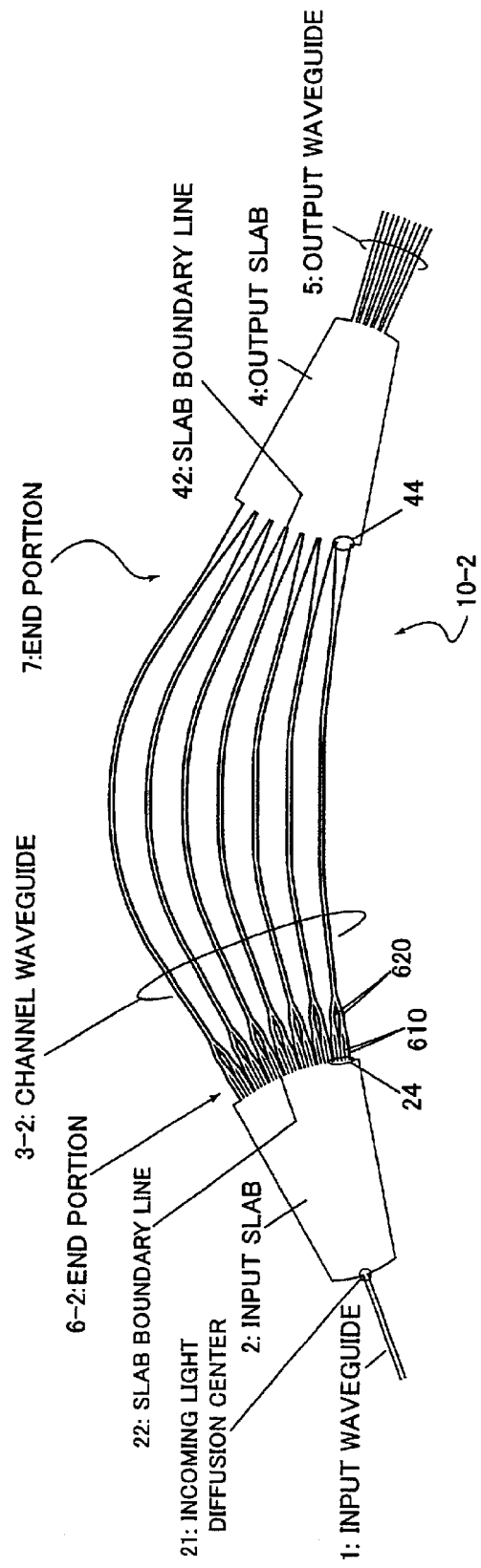

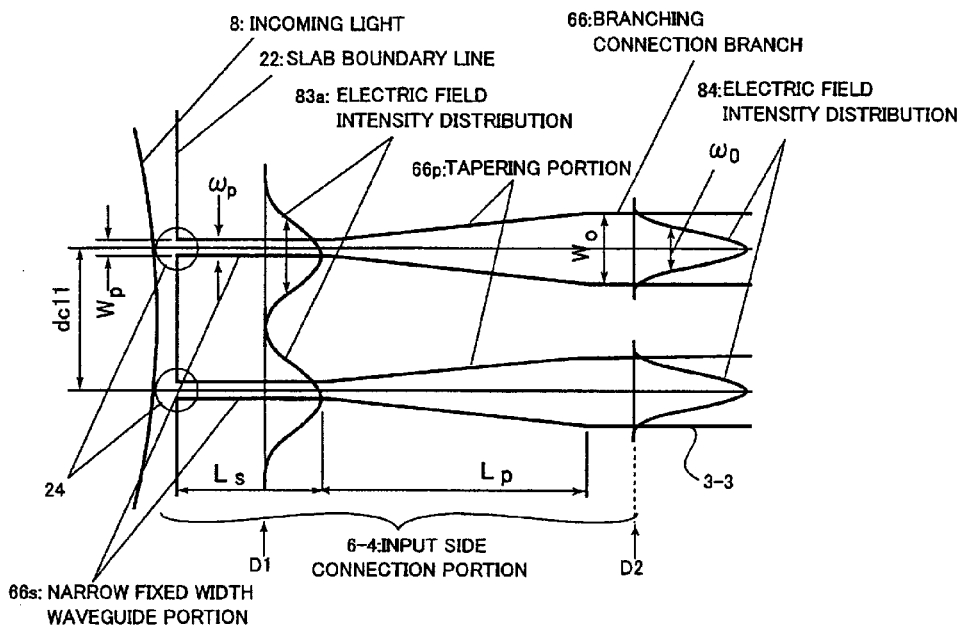
FIG. 22(a) WHERE NARROW FIXED WIDTH WAVEGUIDE PORTION IS PROVIDED
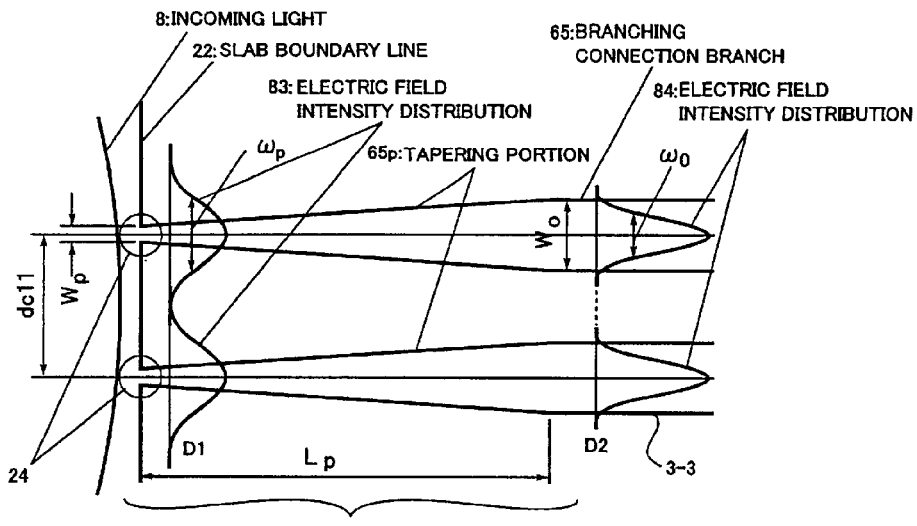
FIG. 22(b) WHERE NARROW FIXED WIDTH WAVEGUIDE PORTION IS NOT PROVIDED

FIG. 29(a)

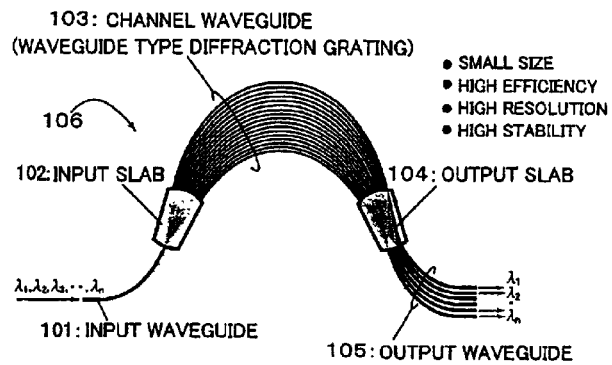

FIG. 29(b)

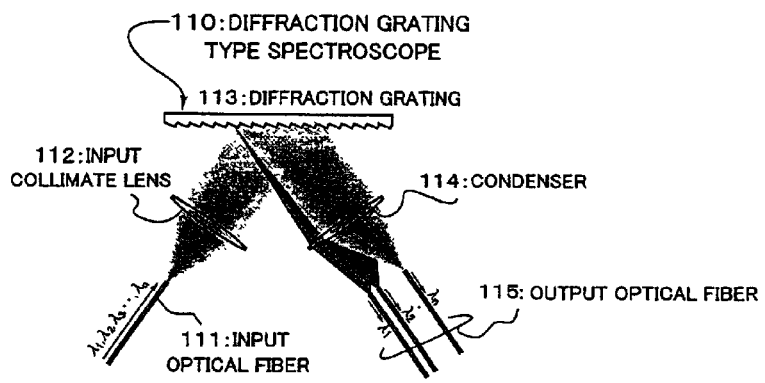

FIG. 29(c)

| COMPONENTS OF AWG | COMPONENTS OF CORRESPONDING DIFFRACTION-GRATING TYPE SPECTROSCOPE | FUNCTION |
|---|---|---|
| INPUT WAVEGUIDE | INPUT OPTICAL FIBER | ROLE OF INCIDENCE SLIT (TO SPREAD LIGHT) |
| INPUT SLAB | INPUT COLLIMATE LENS | ALIGN AND IRRADIATE INCOMING LIGHT POWERS UPON DIFFRACTION GRATING |
| CHANNEL WAVEGUIDE | DIFFRACTION GRATING | DEFLECT LIGHT TO PREDETERMINED ANGLE FOR EACH WAVELENGTH (DEMULTIPLEXING) |
| OUTPUT SLAB | CONDENSER | MULTIPLEX DEFLECTED (DEMULTIPLEXED) LIGHT |
| OUTPUT WAVEGUIDE | OUTPUT OPTICAL FIBER | ROLE OF EMERGENCE SLIT (TO CUT AWAY PART OF SPECTRUM) |

US 6,810,167 B2

WAVELENGTH DIVISION DEMULTIPLEXING APPARATUS

BACKGROUND OF THE INVENTION

1) Field of the Invention

This invention relates to a wavelength division demultiplexing apparatus particularly suitable for use with a wavelength division multiplexing and demultiplexing apparatus of the arrayed waveguide grating (AWG) type, which is used for wavelength division multiplex communication.

2) Description of the Related Art

FIG. 28 is a block diagram showing a configuration of a common wavelength division multiplexing and demultiplexing apparatus of the AWG type. The wavelength division multiplexing and demultiplexing apparatus can function as any of a wavelength division multiplexing apparatus and a wavelength division demultiplexing apparatus. In the following description, a wavelength division multiplexing and demultiplexing apparatus is referred to as MUX/DEMUX and is used as a term signifying a wavelength division multiplexing apparatus or a wavelength demultiplexing apparatus unless otherwise specified. Further, description is given of a case wherein, taking notice principally of the demultiplexing function from between the multiplexing function and the demultiplexing function the MUX/DEMUX has, the MUX/DEMUX functions as a wavelength division demultiplexing apparatus. It is to be noted that the inputting and outputting directions of light when the wavelength division multiplexing function of the MUX/DEMUX operates are reverse to those when the wavelength division demultiplexing function of the MUX/DEMUX operates.

Referring to FIG. 28, the MUX/DEMUX 106 shown includes a single input waveguide 101, an input slab 102, a plurality of channel waveguides 103, an output slab 104, and n output waveguides 105 all formed on a substrate 100 such that the input waveguide 101, input slab 102, channel waveguides 103, output slab 104 and output waveguides 105 may have a relatively high refractive index or indexes when compared with that of a surrounding region 100A.

It is to be noted that, in the following description, a portion formed from a material which has a relatively high refractive index when compared with that of the region 100A is sometimes referred to as "core", and another portion formed from a material which has a relatively low refractive index and surrounding the core such as the region 100A is sometimes referred to as "clad". The input waveguide 1, input slab 2, channel waveguides 3, output slab 4 and output waveguide 5 correspond to the core, and the region 100A surrounding the input waveguide 1, input slab 2, channel waveguides 3, output slab 4 and output waveguide 5 corresponds to the clad.

In the MUX/DEMUX 106 shown in FIG. 28, when light multiplexed in a wavelength region is inputted to the input waveguide 101 of the MUX/DEMUX 106, light split for different wavelengths is outputted from channels #1 to #n of the output waveguides 105. On the other hand, when light of a plurality of different wavelengths is inputted to the channels #1 to #n of the output waveguides 105, light in which the light of all of the wavelengths is bunched and multiplexed in a wavelength region is outputted from the input waveguide 101.

In the following, the configuration of the MUX/DEMUX 106 is described in comparison with the configuration of a conventional spectroscope (monochro-meter). The functions of the MUX/DEMUX 106 are implemented, for example, by not only AWG type devices shown in FIGS. 28 and 29(a) but also spectroscope type devices shown in FIGS. 35 and 29(b) and other devices.

FIG. 35 is a view showing an example of a configuration of a conventional spectroscope. Referring to FIG. 35, the spectroscope shown is of the bulk diffraction grating type, and it is generally difficult to reduce the pitch of a diffraction grating. In contrast, a spectroscope of the AWG type does not require the pitch, and it is only necessary to design the differences in length among waveguides which compose the AWG.

Meanwhile, FIG. 29(a) is a schematic view showing a core pattern of the waveguides of the MUX/DEMUX 106 of the AWG type and particularly shows core portions of the MUX/DEMUX 106. The components (elements or parts) 101 to 105 of the MUX/DEMUX 106 shown in FIG. 29(a) individually correspond to components of a spectroscope.

FIG. 29(c) is a view illustrating a corresponding relationship between the components of a wavelength division multiplexing and demultiplexing apparatus configured using waveguides and a conventional spectroscope. The corresponding relationship is described with reference to FIG. 35. The spectroscope 110 shown in FIG. 35 includes, in addition to a diffraction grating 113 with an uneven or rough surface, a single input optical fiber 111, an input collimate lens 112, a condenser lens 114, and n output optical fibers 115.

The input waveguide 101 which is a component of the MUX/DEMUX 106 (refer to FIG. 29(a)) diffuses and outputs wavelength division multiplexed laser light, which is an object of wavelength division demultiplexing, to the input slab 102 in the following stage. Further, as seen in FIG. 29(c), the input waveguide 101 functionally corresponds to the input optical fiber 111 of the spectroscope 110 in that it has a role of an incidence slit for spreading light. It is to be noted that FIG. 29(a) is a schematic view particularly showing core elements in the MUX/DEMUX 106.

Similarly, the input slab 102 diffuses light incoming to the input waveguide 101 and couples the diffused light to the channel waveguide 103 in the following stage. The input slab 102 corresponds to a function of the input collimate lens 112 in the spectroscope 110 (a function of aligning incoming light powers from the input optical fiber 111 and irradiating them upon the diffraction grating 113 in the following stage).

Meanwhile, the channel waveguides 103 which correspond to the diffraction grating 113 of the spectroscope 110 deflect light to a predetermined angle for each of wavelengths as hereinafter described, and the output slab 104 which corresponds to the condenser lens 114 condenses the lights outputted (outgoing or radiated) from and diffracted by the channel waveguides 103. The output waveguides 105 which correspond to the output optical fibers 115 cut part of a spectrum of the light outgoing from the output slab 104.

Here, the channel waveguides 103 are formed with different lengths such that the channel waveguide at the lowermost position of the MUX/DEMUX 106 shown in FIGS. 28 and 29(a) has the smallest length and any other channel waveguide at a higher position has a successively increasing length. The differences in length between adjacent ones of the channel waveguides are equal to one another. The channel waveguides perform significant operation in wavelength division (splitting of light for each wavelength) or wavelength division multiplexing. In the following, operation of the channel waveguides 103 is described.

FIGS. 30(a) and 30(b) are views showing three neighboring channel waveguides of a plurality of channel waveguides 103 of the MUX/DEMUXs 106 shown in FIGS. 28 and 29(*a*), respectively. Each of the channel waveguides 131 to 133 shown in FIGS. 30(*a*) and 30(*b*) has positions (dark points) of a "crest" and positions (blank points) of a "hollow" of a light wave. Here, where a light wave propagating in the channel waveguides 131 to 133 is represented by cos(α) (α represents the phase), the "crest" represents the position at which the phase α is 2×n×π and the "hollow" represents the position at which the phase α is (2n+1)×π. It is to be noted that n and π represent a positive integer and the number π, respectively.

Accordingly, in each of FIGS. 31(*a*) and 31(*b*), the length between two adjacent "crests" is equal to the wavelength of the light wave propagating in the channel waveguides 131 to 133. In particular, the light wavelengths shown in FIGS. 30(*a*) and 30(*b*) are equal to $\lambda_0$ and $\lambda_1$, respectively.

FIG. 30(*a*) shows a phase of light when light which has a wavelength equal to a central wavelength in a light wavelength arrangement used for wavelength division multiplex transmission. The length of each of the channel waveguides 103 is designed such that an accurately integral number of waves of light of the central wavelength $\lambda_0$ among the wavelengths of the wavelength division multiplexed light may be included therein. More particularly, in the case of FIG. 30(*a*), the lengths of the channel waveguides 103 are designed such that nine waves of the central wavelength $\lambda_0$ are included in the shortest waveguide 131, ten waves of the central wavelength $\lambda_0$ are included in the middle waveguide 132, and eleven waves of the central wavelength $\lambda_0$ are included in the longest waveguide 133.

For example, as seen in FIG. 31, when the channels #1 to #11 are set in the order from a short wavelength band, the wavelength of the light set to the channel #6 corresponds to the central wavelength $\lambda_0$ described above.

In particular, as seen in FIG. 30(*a*), light waves which have a component of a central wavelength to be outputted from the waveguides 131 to 133 have the same phase at the position of a slab boundary line 142 between the output slab 104 and the waveguides 131 to 133. In other words, an equiphase wave surface p1 of the light waves of the wavelength λ0 outputted from the channel waveguides 103 is perpendicular to the waveguides 131 to 133, and the lights outputted from the three waveguides 131 to 133 are diffracted to an accurately horizontal direction d1 with respect to the output azimuths of the waveguides 131 to 133.

However, as seen in FIG. 30(*b*), light waves of the wavelength λ1 shorter by Δλ than that of the central wavelength component do not have the same phase at the position of the slab boundary line 142 between the output slab 104 and the waveguides 131 to 133, but have the same phase at another position shifted in a unit of Δλ among the neighboring waveguides 131 to 133. In other words, an equiphase wave surface p2 of the light waves of the wavelength λ1 is not perpendicular to the waveguides 131 to 133, and also the lights outputted from the waveguides 131 to 133 are diffracted to an upper side direction d2 in FIG. 30(*b*).

It is to be noted that light waves whose wavelength is longer by Δλ than the central wavelength λ0 are diffracted to a lower side direction in FIG. 30(*b*) in accordance with a principle similar to that described above. Accordingly, since the diffraction direction (diffraction angle) by each of the channel waveguides 103 depends upon the value of the optical wavelength of the wavelength division multiplexed light, the channel waveguides 103 can demultiplex the wavelength division multiplexed light.

The output slab 104 condenses the lights diffracted in predetermined diffraction directions for the individual wavelengths and multiplexed by the channel waveguides 103 and supplies the condensed lights to the output waveguides 105 of corresponding channels.

On the contrary, if lights of particular wavelengths (usually, lights of a spectrum of a width smaller than the bandwidth of the MUX/DEMUX 106 are used for WDM communication) corresponding to lights to be outputted to the channels #1 to #n (for example, outputs of ch#1 to ch#11 shown in FIG. 31) are inputted to the output waveguides 105 (refer to FIG. 28) for the outputs of the channels #1 to #n, then all of the lights are multiplexed and outputted from the input waveguide 101 (refer to FIG. 28).

FIG. 31 illustrates an example of the spectral characteristic and the insertion loss of the MUX/DEMUX 106 described above with reference to FIGS. 28 and 29(*a*). If wavelength division multiplexed light for 11 channels (channel (ch) #1 to channel #11) is inputted to the input waveguide 101, then the output waveguides 105 outputs lights with such intensities as seen from the channels #1 to #11 of FIG. 31.

A basic configuration and operation of an AWG which is an apparatus relating to the present invention are disclosed, for example, in "IEEE JOURNAL OF SELECTED TOPICS IN QUANTUM ELECTRONICS. VOL. 2 No. 2, pp.236–250 (1996)" and so forth. The wavelength division multiplexing and demultiplexing apparatus according to the present invention is similar, in regard to the configuration, function and operation other than those of the characteristic part of the present invention, to those disclosed in the reference document mentioned above.

The insertion loss of the MUX/DEMUX 106 is a loss at which the transmission factor for each of the channels #1 to #n of the output waveguides 105 exhibits a maximum value, or in other words, a loss with a wavelength with which the loss is lowest with respect to input light, and differs among different channels. For example, as seen in FIG. 31, the insertion loss of the MUX/DEMUX 106 differs among the output channels (#1 to #n).

Such insertion loss as described above with reference to FIG. 31 occurs principally at a connection location between the input slab 102 and each of the channel waveguides 103 (refer to a slab boundary line 122 shown in FIG. 30; hereinafter referred to as node) and a node between each of the channel waveguides 103 and the output slab 104 (refer to the slab boundary line 142 shown in FIGS. 30(*a*) and 30(*b*)).

FIGS. 32(*a*) to 32(*c*) are views each illustrating a factor of occurrence of the insertion losses at the nodes between the input slab 102 and the channel waveguides 103 described above. Particularly, FIG. 32(*a*) shows essential part of the MUX/DEMUX 106, and FIG. 32(*b*) shows the input slab 102 in an enlarged scale while FIG. 32(*c*) shows the nodes between the input slab 102 and the channel waveguides 103 in a further enlarged scale.

If attention is paid to the slab boundary line 122 on which the nodes between the input slab 102 and the channel waveguides 103 are positioned as illustrated in FIG. 32(*c*), of light 8 advancing from the input slab 102 toward a channel waveguide 103, light 85 which is transmitted by the channel waveguide 103 is valid, but light which arrives at a gap portion 123 is scattered and makes invalid light 86 and therefore becomes loss.

As a first countermeasure for reducing such insertion loss as described above, it is a possible idea to use such an input slab 102-1 as shown in FIG. 33(*a*) as the input slab for the MUX/DEMUX 106 shown in FIG. 28. The input slab 102-1 shown in FIG. 33(a) has a reduced channel waveguide distance dc so that the connection loss of the channel waveguides 103 is reduced.

In particular, if the channel waveguide distance dc is reduced in a condition that the width w, the focal length f (distance from the channel waveguide center 21 to the incoming position of the channel waveguide 103) and the channel waveguide number are fixed as illustrated in FIG. 33(b), then the connection loss of the channel waveguides can be reduced.

In the following, subjects to be solved are described in paragraphs (1-1) to (1-3).

(1-1) In the MUX/DEMUX 106 shown in FIG. 28, however, since the shape of the nodes between the input slab 102 and the channel waveguides 103 and the shape of the nodes between the output slab 104 and the channel waveguides 103 are symmetrical to each other, if the channel waveguide distance dc (refer to FIG. 33(a)) between the channel waveguides 103 of the input slab 102 side is decreased, then also the distance (not shown) between the channel waveguides 103 of the output slab 104 side decreases. In this instance, a disadvantage occurs that, in the proximity of the output slab 104 described below, lights propagating in the channel waveguides 103 join together and interfere with each other.

In particular, an optical waveguide has a characteristic that, as a plurality of waveguides come close to each other to make the distance therebetween small, lights propagating in the waveguides join together. Therefore, if the distance between the channel waveguides 103 is made small, lights propagating in the channel waveguides 103 join together in the proximity of the output slab 104 and interfere with each other. Further, as shown in FIG. 30(b), the MUX/DEMUX 106 functions as a wavelength division multiplexing and demultiplexing apparatus since a phase difference is produced among lights propagating in the channel waveguides 131 to 133 at the output apertures 142 of the channel waveguides 131 to 133.

Here, if it is assumed that the distance between the channel waveguides 131 to 133 in the proximity of the output slab 104 decreases until lights propagating in the channel waveguides 131 to 133 join together, then the phase varies and the wavelength division demultiplexing function drops (depresses). Accordingly, the MUX/DEMUX 106 illustrated in FIG. 28 has a subject to be solved in that it is impossible to decrease the distance (channel waveguide distance dc shown in FIGS. 32(c) and 33(a)) between the nodes between the input slab 102 and the channel waveguides 103 and the distance (not shown) between the nodes between the output slab 104 and the channel waveguides 103 as means for reducing the insertion losses.

(1-2) As a second countermeasure for reducing the connection (scattering) loss of the input slab 102 and output slab 104 and the channel waveguides 103 shown in FIG. 28, it is a possible idea to form, for example, such channel waveguides 103-1 as shown in FIG. 34(a).

In particular, as seen in FIG. 34(a), at an input side node 107 at which the channel waveguides 103-1 are connected to the input slab 102, tapering connection branches 162 whose width reduces as the distance from the input slab 102 increases are formed (in the following description, such a pattern that the waveguide width changes smaller as with the tapering connection branches 162 is referred to as tapering pattern or tapering).

In the countermeasure illustrated in FIG. 34(a), the scattering loss of the input side node 107 decreases as the width with which the tapering connection branches 162 are connected to the input slab 102 increases.

However, in the MUX/DEMUX 106 to which the channel waveguides 103-1 having such tapering connection branches 162 as described above with reference to FIG. 34(a) are applied, such higher-order mode light as hereinafter described is excited in the tapering connection branches 162 formed between the input slab and the channel waveguides as hereinafter described, and the excited higher-order mode light is radiated to the outside of the channel waveguides (core), resulting in loss.

Light incoming to the tapering connection branch 162 from the input slab 102 propagates in the tapering connection branch 162 formed as a core while the intensity peak is split into two (at a location at which higher-order mode light is excited) and then joined back into one. In the process wherein the number of peaks varies, part of the light (which corresponds to the higher-order mode light) is radiated to the outside of the channel waveguide (core) 103-1, resulting in loss.

Accordingly, also the MUX/DEMUX to which the channel waveguide 103-1 shown in FIG. 34(a) is applied has a subject to be solved in that it suffers from intensity-demultiplex light loss of higher-order mode light radiated to the outside of the channel waveguide 103-1.

(1-3) As described in paragraph (1-1) above, it is necessary to prevent joining together of lights propagating in the channel waveguides 103 at the output apertures of the channel waveguides 103 and keep the phase difference (phase difference between lights which propagate, for example, in the channel waveguides 103 of FIG. 30(b)) from which wavelength division multiplexing and demultiplexing operations arise. To this end, it is demanded to keep the distance between the channel waveguides 103 of the output slab 104 side great.

Further, it is necessary to make the gap (for example, the gap portion 123 shown in FIG. 32(c)) small. To this end, it is demanded to make the distance between the channel waveguides 103 of the input slab 102 side (channel waveguide distance dc shown in FIGS. 32(c) and 33(a)) small.

SUMMARY OF THE INVENTION

It is an object of the present invention to provide a wavelength division multiplexing and demultiplexing apparatus of the type wherein the shapes of an input slab and an output slab are symmetrical to each other, by which, while the distance between channel waveguides at nodes between the output slab and the channel waveguides is kept great, the distance between the channel waveguides at nodes between the input slab and the channel waveguides can be made small thereby to reduce the loss.

It is another object of the present invention to provide a wavelength division demultiplexing apparatus which can suppress excitation of higher-order mode light to reduce the loss caused by such higher-order mode light.

In order to attain the object described above, according to an aspect of the present invention, there is provided a wavelength division demultiplexing apparatus, comprising a substrate, a first waveguide, disposed on the substrate, for propagating wavelength division multiplexed light having a plurality of wavelength components, a first slab, disposed on the substrate, for diffusing the wavelength division multiplexed light inputted from the first waveguide, a plurality of channel waveguides, disposed on the substrate and having a series of different waveguide lengths increasing with a predetermined difference, for receiving and propagating the wavelength division multiplexed light diffused by the first slab, separately from each other channel waveguide, a second slab, disposed on the substrate, for receiving the wavelength division multiplexed light separately propagated through the plural channel waveguides and demultiplexing the received wavelength division multiplexed light into the plurality of wavelength components with condensing each of the plural wavelength components, and a second waveguide, disposed on the substrate, for propagating the light demultiplexed by the second slab therein, the channel waveguides and the first slab being optically connected to each other at a number of nodes greater than the number of nodes at which the channel waveguides and the second slab are connected to each other.

According to another aspect of the present invention, there is provided a wavelength division demultiplexing apparatus, comprising a substrate, a first waveguide, disposed on the substrate, for propagating wavelength division multiplexed light having a plurality of wavelength components, a first slab, disposed on the substrate, for diffusing the wavelength division multiplexed light inputted from the first waveguide, a plurality of channel waveguides, disposed on the substrate and having a series of different waveguide lengths increasing with a predetermined difference, for receiving and propagating the wavelength division multiplexed light diffused in the first slab, separately from each other channel waveguide, a second slab, disposed on the substrate, for receiving the wavelength division multiplexed light separately propagated through the plural channel waveguides and demultiplexing the received wavelength division multiplexed light into the plurality of wavelength components with condensing each of the plural wavelength components, and a second waveguide, disposed on the substrate, for propagating the light demultiplexed by the second slab therein, each of the channel waveguides having, in the proximity of a portion thereof at which the channel waveguide is optically connected to the first slab, a plurality of branches or waveguides through core to which the wavelength division multiplexed light from the first slab is inputted and a merging portion formed integrally with the branches or waveguides through core for optically coupling the wavelength division multiplexed light from the branches or waveguides through core.

In this instance, preferably each of the branches or waveguides through core has a width with which higher-order mode light of the wavelength division multiplexed light inputted thereto is cut off, the higher-order mode light being light of a mode or modes higher than the zero order mode, and a coupling contact at the merging portion is formed with a width with which the higher-order mode light of the distributed light inputted thereto can be excited.

Further preferably, each of the branches or waveguides through core is formed with a width which decreases in a tapering fashion from a portion thereof adjacent the merging portion toward the first slab.

Each of the branches or waveguides through core may have a tapering portion having a width which decreases in a tapering fashion from a portion thereof adjacent the merging portion toward the first slab and a fixed small width waveguide having a substantially fixed width substantially equal to the width of the tapering portion at a position at which the tapering portion has the smallest width for optically connecting the first slab and the tapering portion to each other.

In this instance, a boundary interface of the first slab to each of the channel waveguides may be formed in an arc centered at the center of diffusion of the light diffused in and inputted from the first slab to the boundary interface, and each of the branches or waveguides through core may have a center axis disposed on an extension line from the center of diffusion.

According to a further aspect of the present invention, there is provided a wavelength division demultiplexing apparatus, comprising a substrate, a first waveguide, disposed on the substrate, for propagating wavelength division multiplexed light having a plurality of wavelength components, a first slab, disposed on the substrate, for diffusing the wavelength division multiplexed light inputted from the first waveguide, a plurality of channel waveguides, disposed on the substrate and having a series of different waveguide lengths increasing with a predetermined difference, for receiving and propagating the wavelength division multiplexed light diffused in the first slab, separately from each other channel waveguide, a second slab, disposed on the substrate, for receiving the wavelength division multiplexed light separately propagated through the plural channel waveguides and demultiplexing the received wavelength division multiplexed light into the plurality of wavelength components with condensing each of the plural wavelength components, and a second waveguide, disposed on the substrate, for propagating the light demultiplexed by the second slab therein, each of the channel waveguides having, in the proximity of a portion thereof at which the channel waveguide is optically connected to the first slab, a plurality of sets of primary coupling portions each including a plurality of primary branching connection branches for receiving the wavelength division multiplexed light from the first slab and a primary merging portion for optically coupling the wavelength division multiplexed light from the primary branching connection branches, and a secondary coupling portion including a plurality of secondary branching connection branches for receiving the wavelength division multiplexed light coupled by the primary coupling portions and a secondary merging portion for optically coupling the wavelength division multiplexed light from the secondary branching connection branches.

In this instance, preferably each of the branching connection branches has a width with which higher-order mode light of the wavelength division multiplexed light inputted thereto is cut off, and a coupling contact at the merging portion is formed with a width with which the higher-order mode light of the wavelength division multiplexed light inputted thereto can be excited.

Further, a boundary interface of the first slab to each of the channel waveguides may be formed in an arc centered at the center of diffusion of the light diffused in and inputted from the first slab to the boundary interface, and each of the channel waveguides in the proximity of a portion at which the channel waveguide is optically connected to the first slab may have a center axis disposed on an extension line from the center of diffusion. Meanwhile, each of the branching connection branches may be formed with a width which decreases in a tapering fashion from a portion thereof adjacent the merging portion toward the first slab.

Preferably, each of the branching connection branches has a tapering portion having a width which decreases in a tapering fashion from a portion thereof adjacent the merging portion toward the first slab and a fixed small width waveguide having a substantially fixed width substantially equal to the width of the tapering portion at a position at which the tapering portion has the smallest width for optically connecting the first slab and the tapering portion to each other.

According a still further aspect of the present invention, there is provided a wavelength division demultiplexing apparatus, comprising a substrate, a first waveguide, disposed on the substrate, for propagating wavelength division multiplexed light having a plurality of wavelength components, a first slab, disposed on the substrate, for diffusing the wavelength division multiplexed light inputted from the first waveguide, a plurality of channel waveguides, disposed on the substrate and having a series of different waveguide lengths increasing with a predetermined difference, for receiving and propagating the wavelength division multiplexed light diffused in the first slab, separately from each other channel waveguide, a second slab, disposed on the substrate, for receiving the wavelength division multiplexed light separately propagated through the plural channel waveguides and demultiplexing the received wavelength division multiplexed light into the plurality of wavelength components with condensing each of the plural wavelength components, and a second waveguide, disposed on the substrate, for propagating the light demultiplexed by the second slab therein, each of the channel waveguides being formed such that a node thereof to the first slab has a width with which higher-order mode light of the separated light can be excited and the width thereof decreases in a tapering fashion away from the first slab, an island-shaped formation region of a reflection index lower than that of the channel waveguides being provided for each of the channel waveguides in such a manner as to partition the channel waveguide in the proximity thereof at which the channel waveguide is optically connected to the first slab into a plurality of waveguide portions.

In this instance, each of the waveguide portions of each of the channel waveguides partitioned by the island-shaped region may be formed as a waveguide by which higher-order mode light of the wavelength division multiplexed light inputted thereto is cut off, and the waveguide width at a portion at which the partitioned waveguide portions are coupled to each other may have a width with which the higher-order mode light of the distributed light inputted thereto can be excited.

Further, in the wavelength division demultiplexing apparatus, a boundary interface of the first slab to each of the channel waveguides may formed in an arc centered at the center of diffusion of the light diffused in and inputted from the first slab to the boundary interface, and further, each of the channel waveguides in the proximity of a portion at which the channel waveguide is optically connected to the first slab may have a center axis disposed on an extension line from the center of diffusion.

According to a yet further aspect of the present invention, there is provided a wavelength division demultiplexing apparatus, comprising a substrate, a first waveguide, disposed on the substrate, for propagating wavelength division multiplexed light having a plurality of wavelength components, a first slab, disposed on the substrate, for diffusing the wavelength division multiplexed light inputted from the first waveguide, a plurality of channel waveguides, disposed on the substrate and having a series of different waveguide lengths increasing with a predetermined difference, for receiving and propagating the wavelength division multiplexed light diffused in the first slab, separately from each other channel waveguide, a second slab, disposed on the substrate, for receiving the wavelength division multiplexed light separately propagated through the plural channel waveguides and demultiplexing the received wavelength division multiplexed light into the plurality of wavelength components with condensing each of the plural wavelength components, and a second waveguide, disposed on the substrate, for propagating the light demultiplexed by the second slab therein, each of the channel waveguides including, in the proximity of a portion thereof at which the channel waveguide is optically connected to the first slab, a plurality of coupling waveguides connected in tandem in a plurality of stages in a tree-like configuration for optically coupling and propagating the distributed light inputted thereto.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 9 is a schematic view showing a wavelength division multiplexing and demultiplexing apparatus which functions as a wavelength division demultiplexing apparatus according to a third embodiment of the present invention;

FIG. 22(a) is a schematic view illustrating operation of the wavelength division multiplexing and demultiplexing apparatus of FIG. 19 and FIG. 22(b) is a schematic view illustrating propagation of light in a channel waveguide of the wavelength division multiplexing and demultiplexing apparatus shown in FIGS. 12 and 13;

FIG. 29(a) is a schematic view showing a configuration of waveguides of a wavelength division multiplexing and demultiplexing apparatus of the AWG type, FIG. 29(b) is a view showing an example of a configuration of a conventional spectroscope, and FIG. 29(c) is a view illustrating a corresponding relationship between components of a wavelength division multiplexing and demultiplexing apparatus configured using a waveguide and a conventional spectroscope;

DESCRIPTION OF THE PREFERRED EMBODIMENTS (a) First Embodiment

Figure 1:
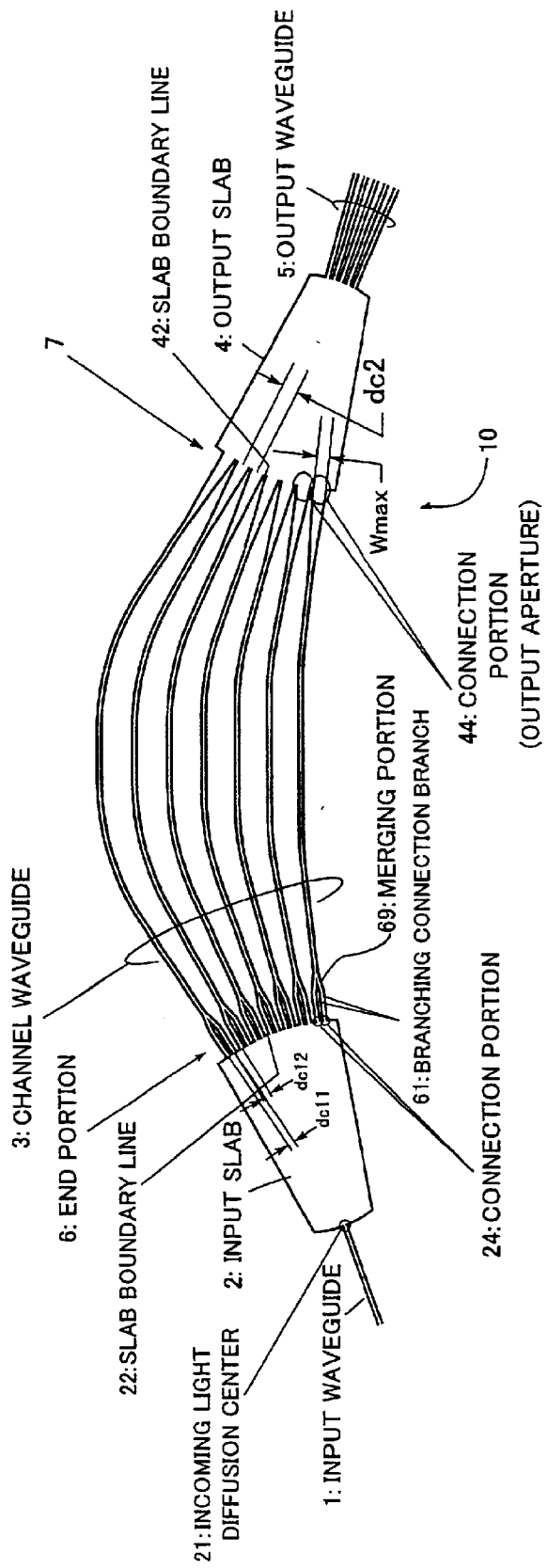
FIG. 1 is a schematic view showing a wavelength division multiplexing and demultiplexing apparatus which functions as a wavelength division demultiplexing apparatus according to a first embodiment of the present invention.

FIG. 1 shows principal components of a MUX/DEMUX 10 to which a wavelength division demultiplexing apparatus according to a first embodiment of the present invention is applied and particularly shows a pattern of a core of optical waveguide devices which compose the MUX/DEMUX 10. Further, FIG. 2 particularly shows a core pattern of connection portions between an input slab 2 and channel waveguides 3 which are components of the MUX/DEMUX 10.

Figure 28:
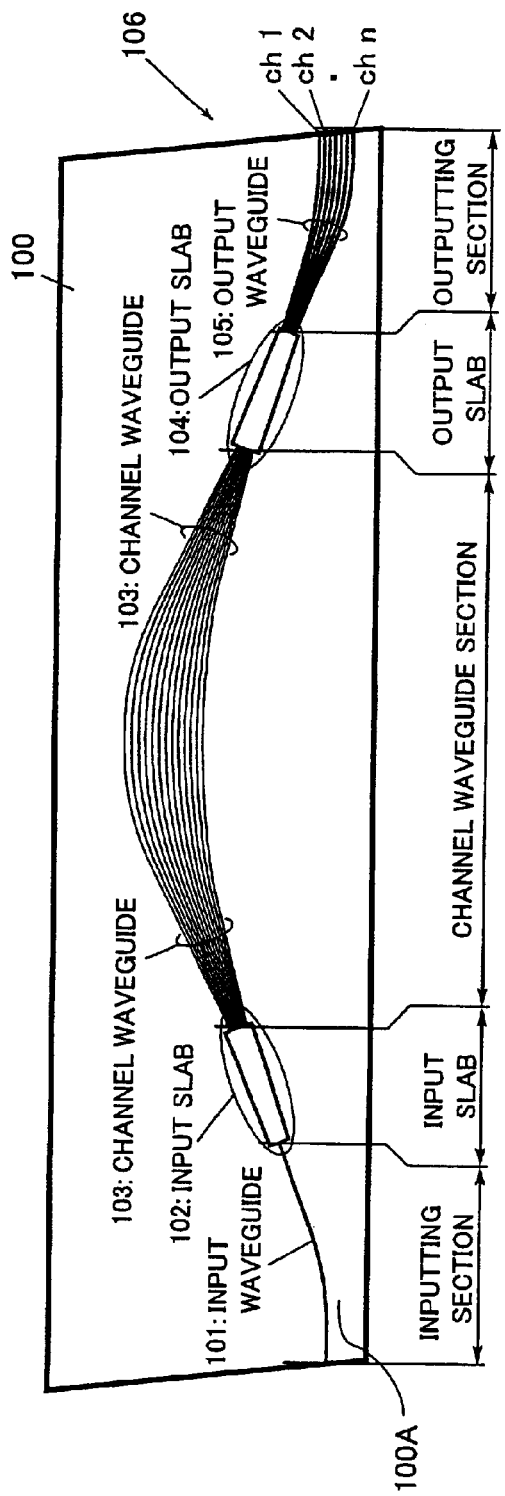
FIG. 28 is a schematic view showing an ordinary wavelength division multiplexing and demultiplexing apparatus.

The MUX/DEMUX 10 according to the first embodiment is formed from, for example, an under clad layer having a refractive index of approximately 1.551 and a thickness of approximately 20 $\mu$m, a core having a refractive index of approximately 1.5588 and a thickness of approximately 7 $\mu$m and an over clad layer having a refractive index of approximately 1.551 and a thickness of approximately 20 $\mu$m, all formed on, for example, such a silicon substrate 100 as described hereinabove with reference to FIG. 28 by a combination of deposition of $SiO_2$ by a CVD (Chemical Vapor Deposition) method and a photolithography process.

In particular, the core of the MUX/DEMUX 10 described above is formed such that upper, lower and left, right portions thereof are surrounded by the under clad or the over clad. Consequently, the core is covered with the clad layers having a comparatively low refractive index so that light can be propagated in a confined state along the core.

As seen in FIG. 1, the core of the MUX/DEMUX 10 has a pattern formed integrally thereon which functions as an input waveguide (first waveguide) 1 for propagating wavelength division multiplexed light of a plurality of channels, an input slab (first slab) 2 for diffusing the light inputted from the input waveguide 1, a plurality of channel waveguides 3 having a series of different waveguide lengths successively increasing with a predetermined difference for receiving and propagating the wavelength division multiplexed light diffused by the input slab 2 separately from each other channel waveguide, an output slab (second slab) 4 for receiving the wavelength division multiplexed light separately propagated through the plural channel waveguides 3 and demultiplexing the received wavelength division multiplexed light into the plurality of wavelength components with condensing each of the plural wavelength components, and output waveguides 5 for propagating the light condensed by the output slab 4 therein.

The individual components are described in more detail.

The input waveguide 1 guides light inputted thereto from the left side in FIG. 1 and delivers the light to the input slab 2. Since the input slab 2 has such a shape that it expands in a direction parallel to a substrate (for example, an element denoted by reference numeral 100 in FIG. 28), the light propagating in the input slab 2 is not confined but diffuses (diverges) in a lateral direction. Therefore, the light coming to the input slab 2 through the input waveguide 1 diffuses radially from the center at an incoming light diffusion center 21 and comes to the channel waveguides 3. Here, the shape of a slab boundary line 22 (refer to FIG. 2) between the input slab 2 and the channel waveguides 3 is an arc of a radius f centered at the incoming light diffusion center 21. Therefore, the light diffused from the incoming light diffusion center 21 shown in FIG. 1 is introduced with the same phase into the plurality of channel waveguides 3. The channel waveguides 3 are formed such that the differences between lengths of adjacent ones thereof from the input slab 2 to the output slab 4 are equal to each other.

Figure 30A:
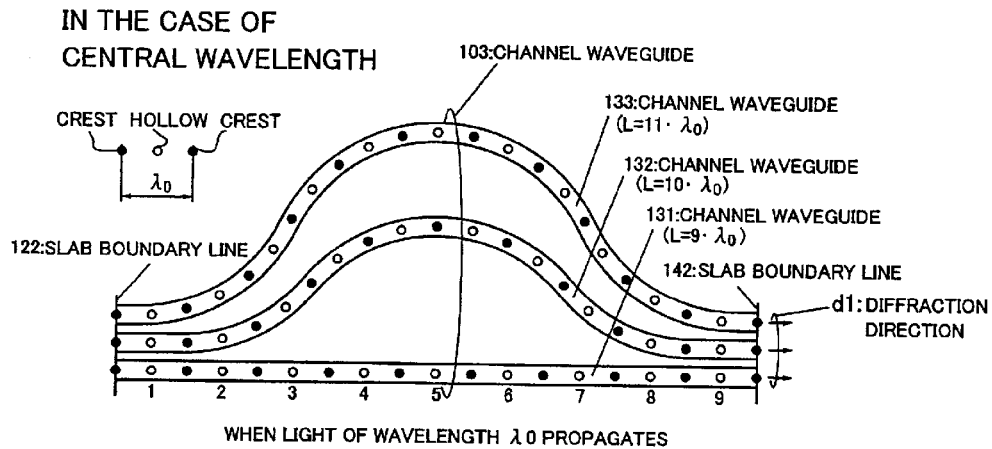
FIGS. 30(a) and 30(b) are schematic views illustrating a principle of operation of a waveguide type diffraction grating.
Figure 30B:
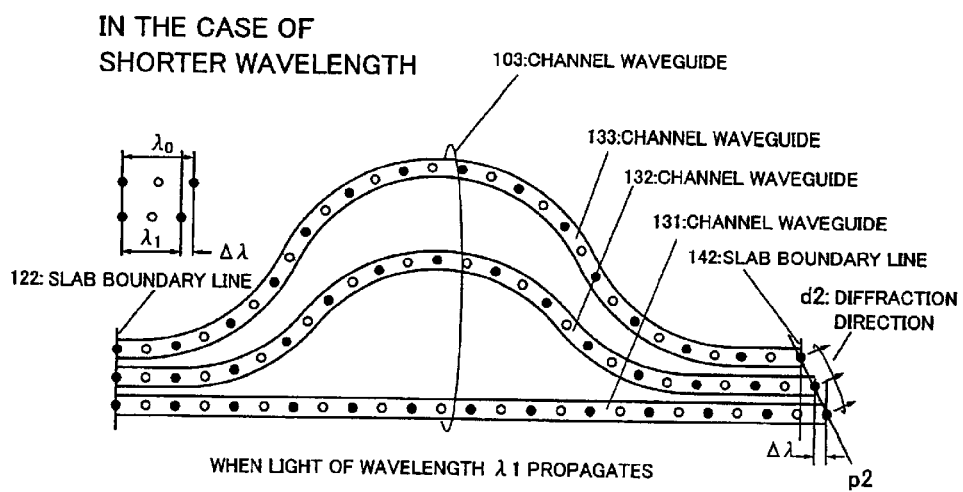
Figure 31:
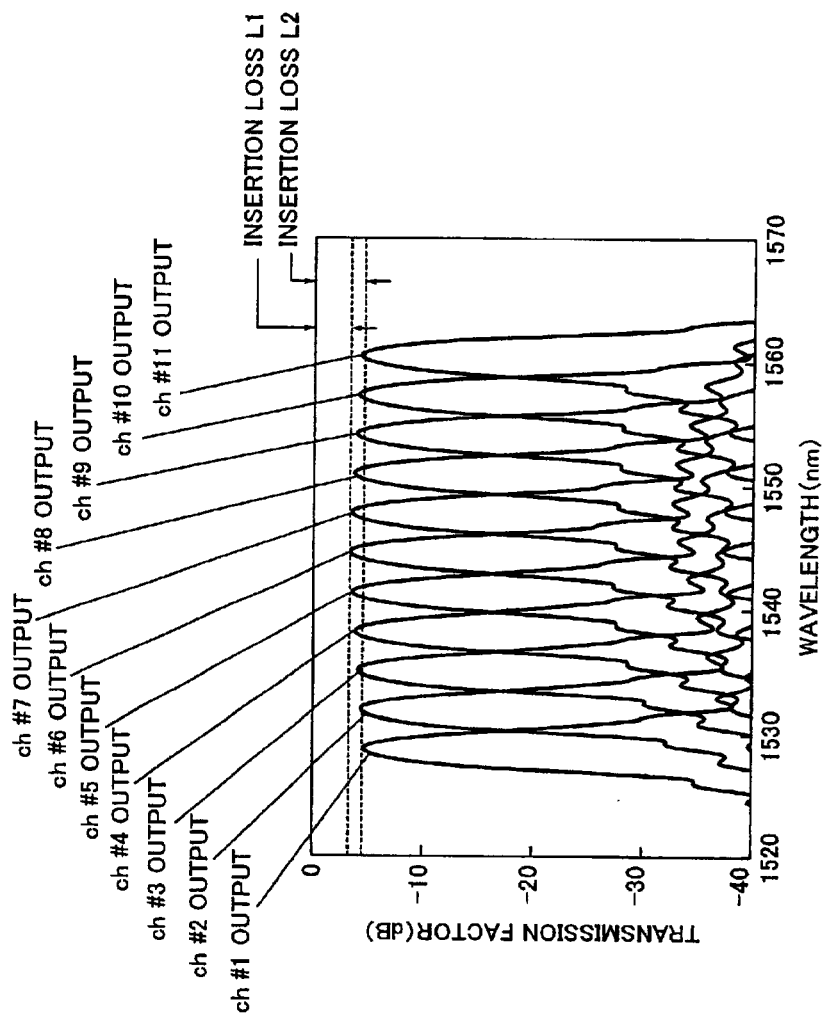
FIG. 31 is a diagrammatic view illustrating operation of the waveguide type diffraction grating shown in FIGS. 30(a) and 30(b)

Due to the differences in length, when lights introduced into adjacent ones of the channel waveguides 3 pass the channel waveguides 3 and come to output apertures 44 of the channel waveguides 3, they exhibit such phase differences as seen in FIG. 30(b). Here, the output apertures 44 correspond to the connection portions 44 between the channel waveguides 3 and the output slab 4. Since the channel waveguides 3 have a function of generating such phase differences, they are called phased array. Further, the difference in length between adjacent ones of the channel waveguides 3 is designed equal to m times the center wavelength $\lambda 0$. Here, m is a positive integer and is called order of channel waveguides 3 or order of the phased array.

Then, the lights passing the channel waveguides 3 and coming to the output apertures 44 of the channel waveguides 3 have an equiphase wave surface which is different depending upon the wavelength. The equiphase wave surface is such as that, for example, denoted by d1 or d2 shown in FIG. 30(a) or 30(b).

Further, in the output slab 4, a slab boundary line 42 between the channel waveguides 3 and the output slab 4 and the output apertures 44 are both formed in a curve of the radius r similarly as in the input slab 2. Therefore, the lights outputted from the output apertures 44 of the channel waveguides 3 to the output slab 4 are condensed at the center of the arc of the radius r which defines the arrangement positions of the output slab 4 and the output apertures 44. Strictly, where the wavelength of the lights outputted from the output apertures 44 of the channel waveguides 3 is shorter than the central wavelength, the lights are condensed on the relatively upper side in FIG. 2, but where the wavelength of the lights outputted from the output apertures 44 of the channel waveguides 3 is longer than the central wavelength, the lights are condensed on the relatively lower side in FIG. 1.

Furthermore, the output waveguide 5 is disposed such that one end thereof is positioned at a position at which lights of a desired wavelength are condensed, and the other end of the output waveguide 5 is used as an output terminal. Usually, an optical fiber or an input terminal of some other optical part is connected to the output end of the output waveguide 5.

For the input waveguide 1, input slab 2, output slab 4 and output waveguides 5, elements basically similar to those described hereinabove with reference to FIG. 28 (refer to reference numerals 101, 102, 104 and 105) can be used.

As described hereinabove, the channel waveguides 3 have a series of different waveguide lengths such that each adjacent ones of the channel waveguides have a predetermined waveguide length difference therebetween so that light propagating in each of the channel waveguides 3 is deflected (demultiplexed) to predetermined particular angles which differ among different wavelengths of the wavelength division multiplexed light and the thus deflected lights are outputted to the output slab 4. Further, intermediate portions of the channel waveguides 3 are formed in a spaced relationship by a necessary distance from each other so that the lights propagating therein may not interfere with each other.

It is to be noted that the width of the input waveguide l and the output waveguides 5 (the width of the core pattern) and the waveguide width of the intermediate portions of the channel waveguides 3 except the opposite end portions 6 and 7 (the width of the core pattern) can be set to approximately 7 $\mu$m.

Further, by setting the central wavelength $\lambda_0$ to 1.552 $\mu$m, the order number m of the channel waveguides 3 to 30 and the effective reflection index of the channel waveguides 3 to approximately 1.552, the difference in length between adjacent ones of the channel waveguides can be set to approximately 30 $\mu$m.

Meanwhile, the end portions 7 of the channel waveguides 3 adjacent the output slab 4 are formed in such a shape that the width thereof decreases in a tapering fashion as the distance from the output slab 4 increases. In particular, the distance dc2 between the channel waveguides 3 at the nodes thereof to the output slab 4 is 22 $\mu$m while the width at the end of the taper (Wmax in FIG. 1) is 19 $\mu$m, and the length of the tapering portions of the channel waveguides 3 is 2.5 mm.

The radii f of the input slab 2 and the output slab 4 of the MUX/DEMUX 10 in the first embodiment are both approximately 6.2 mm, and the widths of the input slab 2 and the output slab 4 are approximately 1 mm. In other words, the slab boundary line 22, nodes 24, slab boundary line 42 and connection portions 44 are all disposed on an arc of the radius of 6.2 mm.

Here, the end portions 6 of the channel waveguides 3 adjacent the input slab 2 have such a configuration as described below, which is a characteristic of the present invention.

In particular, the number of nodes at which each of the channel waveguides 3 and the output slab 4 are optically connected to each other (that is, the number of nodes 24 between the input slab 2 and each of the channel waveguides 3) is greater than the number of connection portions at which each of the channel waveguides 3 and the input slab 2 are connected to each other. More particularly, as seen in FIG. 3, a neighboring portion of each of the channel waveguides 3 to a portion at which the channel waveguide 3 is optically connected to the input slab 2, that is, the end portion 6 of each of the channel waveguides 3 adjacent the input slab 2, is formed from two branching connection branches 61 to which wavelength division multiplexed light from the input slab 2 is inputted and a merging portion 69 formed integrally with the branching connection branches 61 for optically coupling the wavelength division multiplexed light from the branching connection branches 61.

Figure 2:
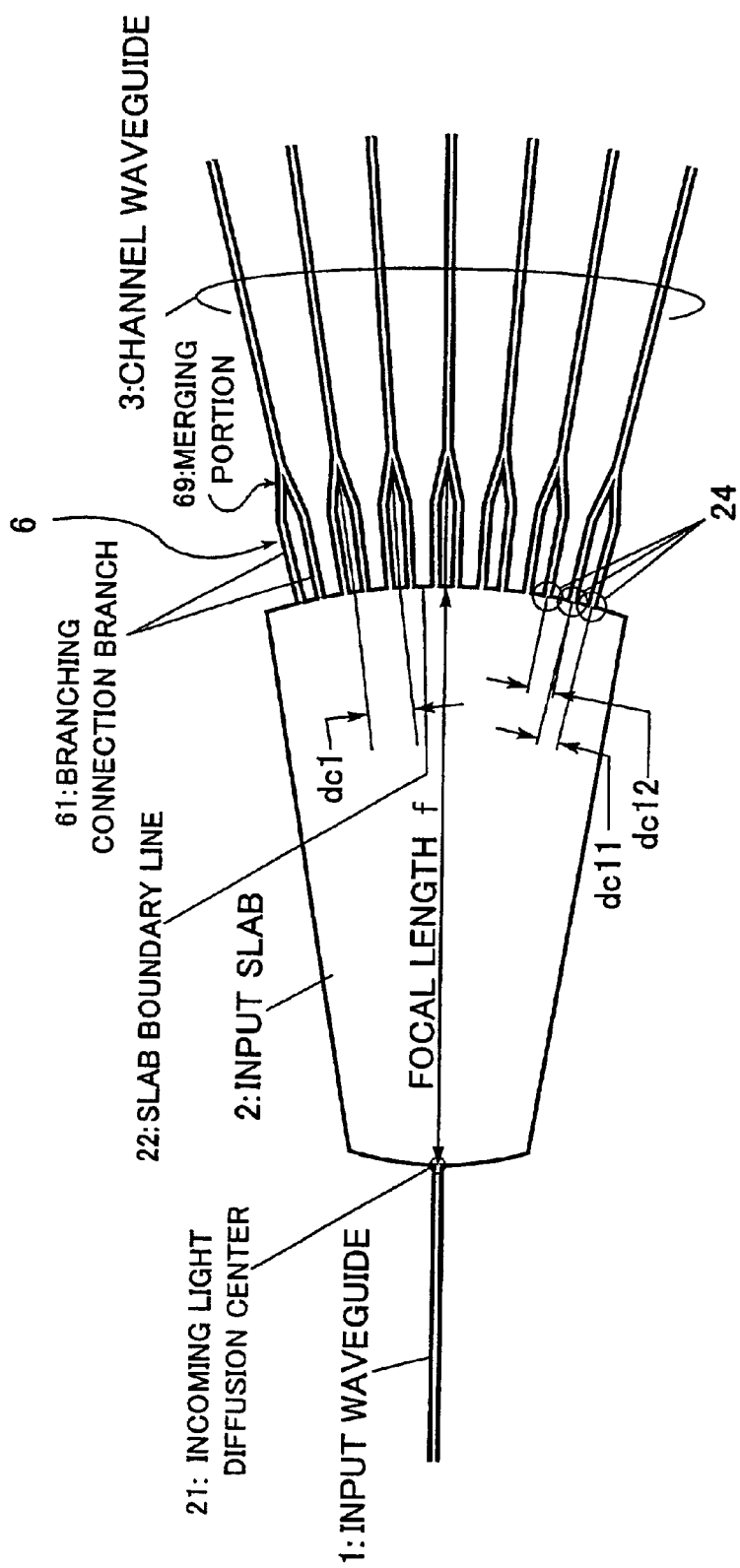
FIGS. 2 and 3 are schematic views showing part of the wavelength division multiplexing and demultiplexing apparatus of FIG. 1.
Figure 32A:
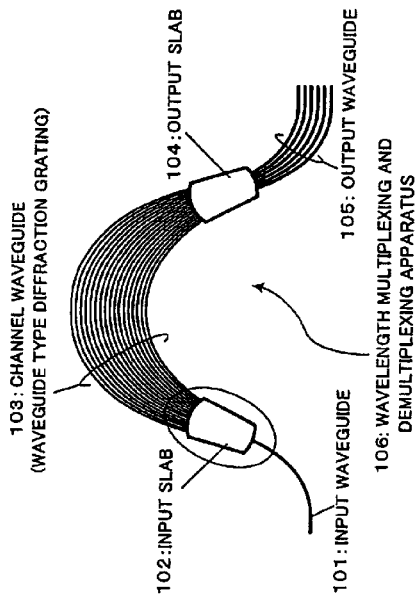
FIGS. 32(a) to 32(c) are schematic views illustrating a factor of occurrence of insertion loss at a node between an input slab and channel waveguides.
Figure 32B:
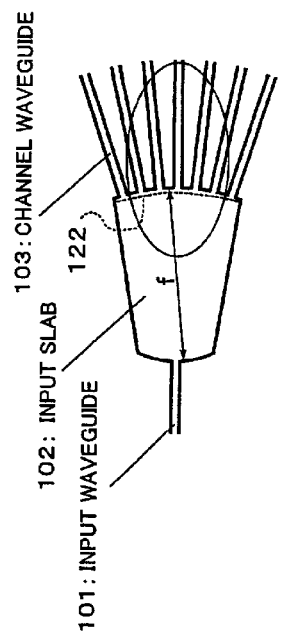
Figure 32C:
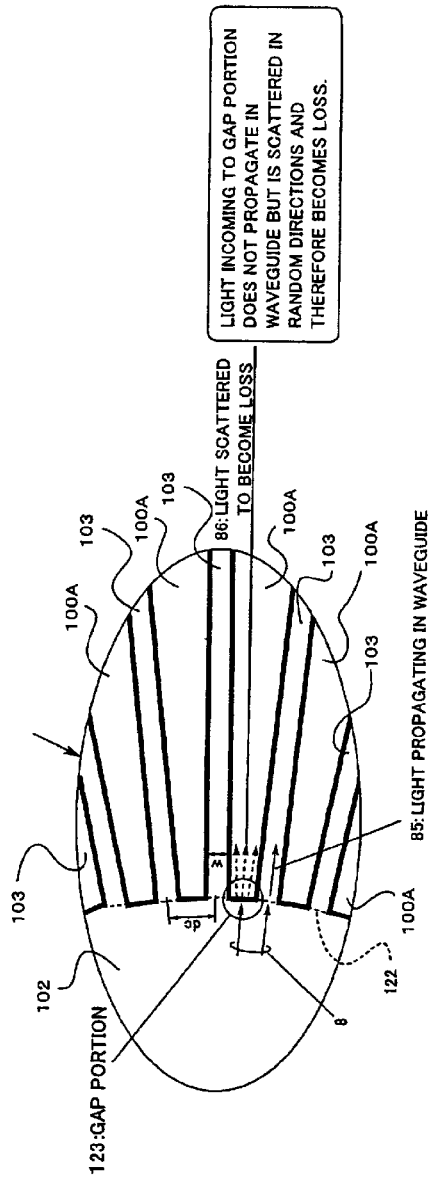
Figure 33A:
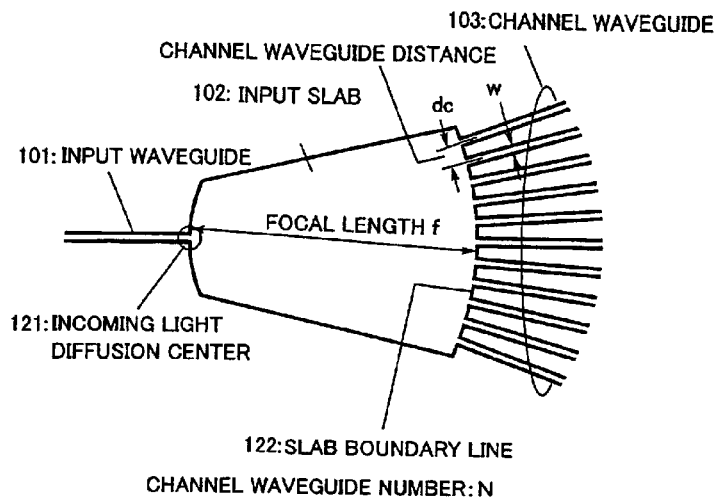
FIG. 33(a) is a schematic view illustrating a first countermeasure for reducing the insertion loss, and FIG. 33 (b) is a diagram illustrating operation of the first countermeasure shown in FIG. 33(a)
Figure 33B:
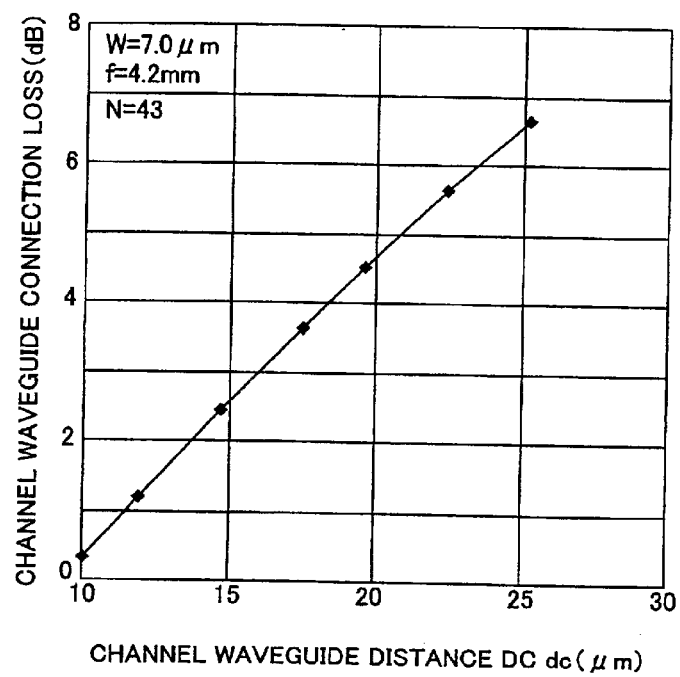
Figure 34A:
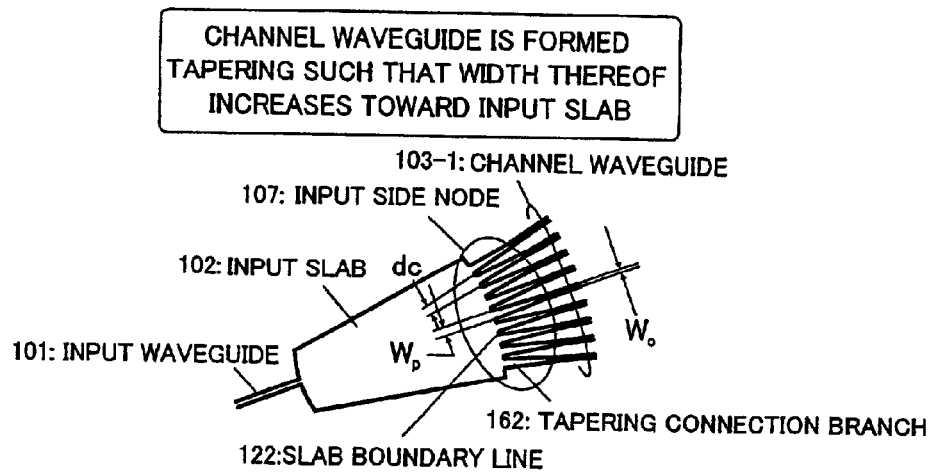
FIG. 34(a) is a schematic view illustrating a second countermeasure for reducing the insertion loss.
Figure 34B:
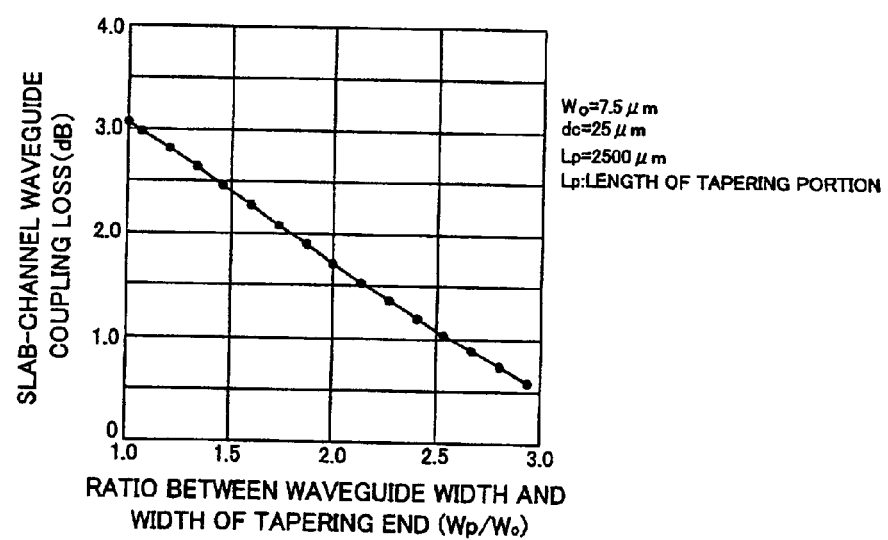
FIG. 34(b) is a diagram illustrating operation of the second countermeasure shown in FIG. 34(a)
Figure 35:
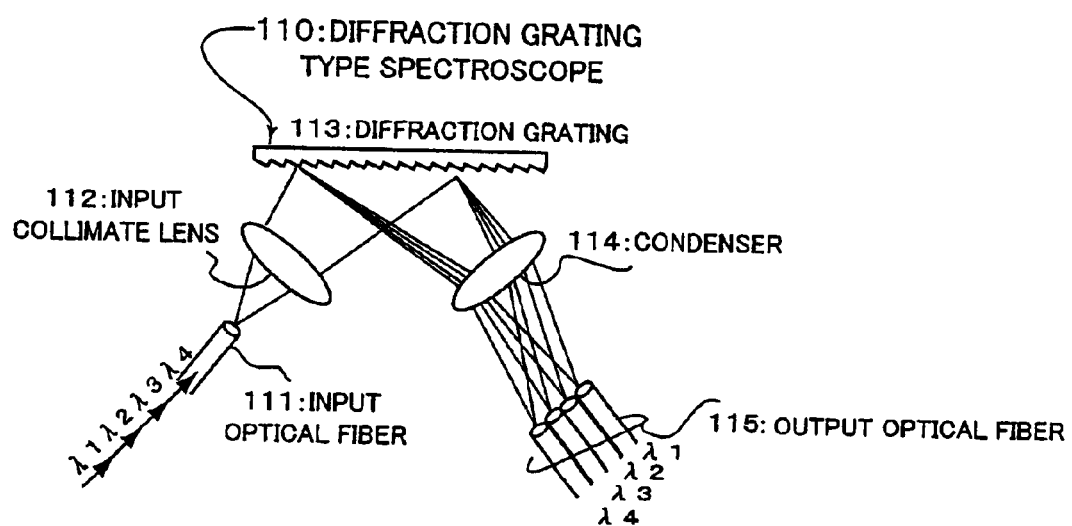
FIG. 35 is a schematic view showing an example of a configuration of a conventional spectroscope.

Consequently, the distance between the locations at which the channel waveguides 3 and the input slab 2 are optically connected to each other (for example, a channel waveguide distance dc11 or dc12 shown in FIG. 2) can be reduced, and the amount of loss caused by the gap portions (such portions as that denoted by reference numeral 123 in FIG. 32(c)) is reduced. It is to be noted that, in this instance, the channel waveguide distance (dc1 in FIG. 2) at the nodes 24 between the input slab 2 and the channel waveguides 3 can be set typically to approximately 22 $\mu$m, the distance (dc11 in FIGS. 1 and 2) between the branching connection branches 61 on the slab boundary line 22 to approximately 11 $\mu$m, the waveguide length from the slab boundary line 22 to the location at which the branching connection branches 61 join together at the merging portion 69 to approximately 5 mm, and the waveguide length of the tapering portion after the branching connection branches 61 join together to approximately 1 mm.

Figure 3:
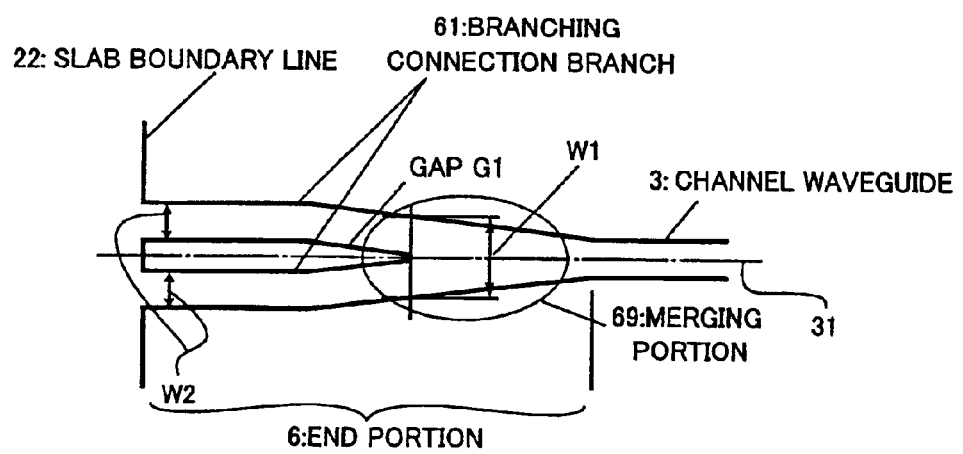

The two branching connection branches 61 shown in FIGS. 2 and 3 are formed such that a center axis 31 of the end portion 6 of each of the channel waveguides 3 adjacent the input slab 2 passes the center of a gap portion G1 positioned between the two branching connection branches 61 and an extension line of the center axis 31 passes the incoming light diffusion center 21. In other words, the center axis 31 of the end portion 6 of each of the channel waveguides 3 coincides with the optical axis of incoming light to the channel waveguide 3.

Further, each of the two branching connection branches 61 is configured such that it has a width W2 with which higher-order mode light of wavelength division multiplexed light inputted thereto from the input slab 2 is cut off. Further, a coupling point of the merging portion 69 between the two branching connection branches 61 is formed such that it has a width W1 with which higher-order mode light of wavelength division multiplexed light inputted thereto is excited.

Figure 4A:
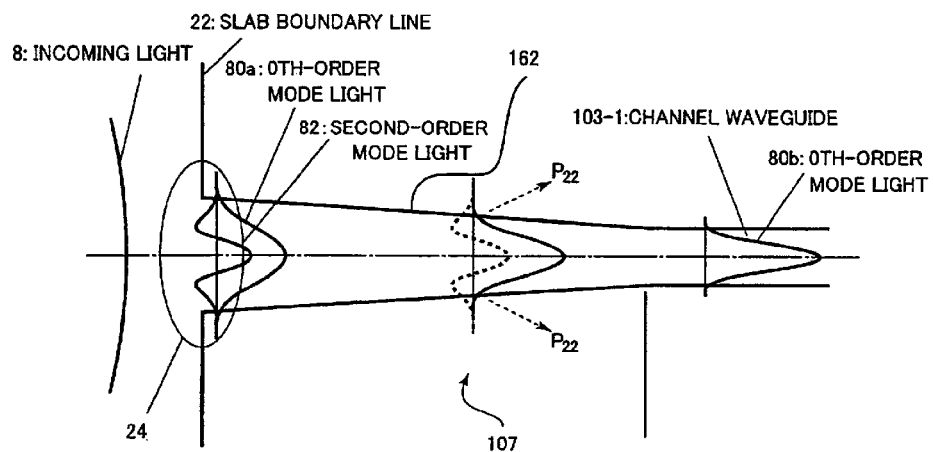
FIG. 4(a) is a schematic view illustrating propagation of light in a channel waveguide of a conventional wavelength division multiplexing and demultiplexing apparatus and FIG. 4(b) is a similar view but illustrating operation of the wavelength division multiplexing and demultiplexing apparatus of FIG. 1.
Figure 4B:
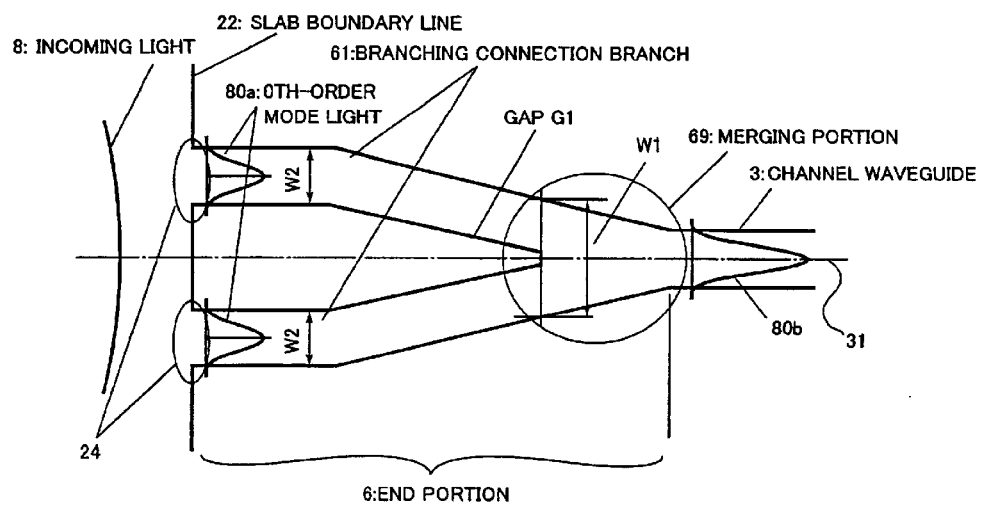

An effect provided by the formation just described is described through comparison in operation between the MUX/DEMUX 10 of the present invention and a conventional MUX/DEMUX with reference to FIGS. 4(a) and 4(b).

FIG. 4(a) illustrates propagation of light in a channel waveguide of a conventional MUX/DEMUX. Referring to FIG. 4(a), if incoming light 8 is introduced into each of the tapering connection branches 162, then while almost all of the light propagates as 0th-order mode light 80a, part of the light is excited as second-order mode light 82 in the proximity of the node 24 between the channel waveguide 3 and the input slab 2. However, since the channel waveguide 162 tapers toward the right side in FIG. 4(a), the second-order mode light 82 is cut off after it advances by a predetermined distance in the channel waveguide 162. As a result, the second-order mode light 82 is radiated to the outside of the waveguide (core) 162 (refer to reference character P22 in FIG. 4(a)) and becomes loss.

In contrast, in each of the channel waveguides 3 shown in FIGS. 1 to 3, each of the branching connection branches 61 is formed from a waveguide of the small width W2 so that higher-order mode light may be cut off there.

FIG. 4(b) illustrates operation of the MUX/DEMUX in the first embodiment. If incoming light 8 is introduced into each of the branching connection branches 61 as seen in FIG. 4(b), then only the 0th-order mode light 80a propagates along the branching connection branch 61, and therefore, no loss occurs.

Further, while the merging portion 69 is formed with the width W1 with which higher-order mode light such as first-order mode light is excited, since a first-order mode light incoming from one of the branching connection branches 61 (for example, an upper one of the branching connection branches 61 in FIG. 4(b)) and another first-order mode light incoming from the other one of the branching connection branches 61 (for example, a lower one of the branching connection branches 61 in FIG. 4(b)) cancel each other, no loss by higher-order mode light occurs.

It is to be noted that, in this instance, the waveguide length of the branching connection branches 61 can be set to approximately 5 mm, the waveguide length of the tapering portion after the branching connection branches 61 join together at the merging portion 69 to approximately 1 mm, and the maximum width W1 of the tapering waveguide portion at the merging portion 69 to approximately 16 µm.

In the wavelength division multiplexing and demultiplexing apparatus 10 according to the first embodiment having the configuration described above, if light (wavelength division multiplexed light) including a plurality of wavelength components is inputted to the input waveguide 1, then the wavelength division multiplexing and demultiplexing apparatus 10 functions as a wavelength division demultiplexing apparatus which outputs, at the channels #1 to #n of the output waveguides 5, light wavelength-demultiplexed (wavelength-split) for the individual channels. On the other hand, the wavelength division multiplexing and demultiplexing apparatus 10 functions also as a wavelength division demultiplexing apparatus which wavelength-multiplexes light of the channels #1 to #n inputted to the output waveguides 5 thereof and outputs the wavelength division multiplexed light through the input waveguide 1.

Further, the channel waveguides 3 output wavelength division multiplexed light at emerging angles different among different wavelengths to the output slab 4 similarly as in the case described hereinabove with reference to FIG. 30 thereby to demultiplex the wavelength-multiplex light into lights of different wavelengths. The output slab 4 collimates the demultiplexed lights of the different wavelengths so that lights of the same length are condensed at the incoming point of each of the output waveguides 5. Consequently, the output waveguides 5 can propagate the lights having different wavelengths among different channels from one another.

In this manner, with the wavelength division demultiplexing apparatus according to the first embodiment of the present invention, since the distances dc11 and dc12 between the nodes at which the channel waveguides 3 and the input slab 2 are optically coupled to each other are reduced, or in other words, since the angle pitch of wavelength division multiplexed lights inputted to the end portions 6 of the channel waveguides 3 adjacent the input slab 2 is reduced, the connection loss between the input slab 2 and the channel waveguides 3 can be reduced.

Further, with the wavelength division demultiplexing apparatus according to the present embodiment, such loss as is caused by radiation of higher-order mode light in a conventional wavelength division demultiplexing apparatus does not occur, and therefore, the loss by the wavelength division demultiplexing apparatus is reduced.

Figure 5:
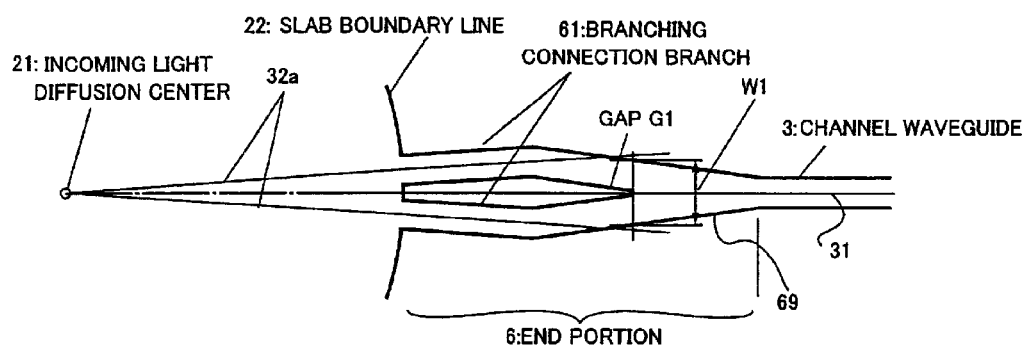
FIG. 5 is a schematic view showing part of a wavelength division multiplexing and demultiplexing apparatus according to a modification to the wavelength division multiplexing and demultiplexing apparatus of FIG. 1.

It is to be noted that each of the branching connection branches 61 may otherwise be configured such that the center axis 32a thereof is disposed on an extension line from the incoming light diffusion center 21 as shown in FIG. 5. This configuration further reduces the loss.

While, in the first embodiment described above, each of the channel waveguides 3 has two branching connection branches 61 and a merging portion 69, the present invention is not limited to this configuration, and the wavelength division demultiplexing apparatus may otherwise include both of a channel waveguide or waveguides having two branching connection branches 61 and a merging portion 69 and a channel waveguide or waveguides having no such branching geometry as the branching connection branches 61 and the merging portion 69. Also in the configuration just described, at least the connection loss between the input slab 2 and the channel waveguides 3 can be reduced.

(b) Second Embodiment

Figure 6:
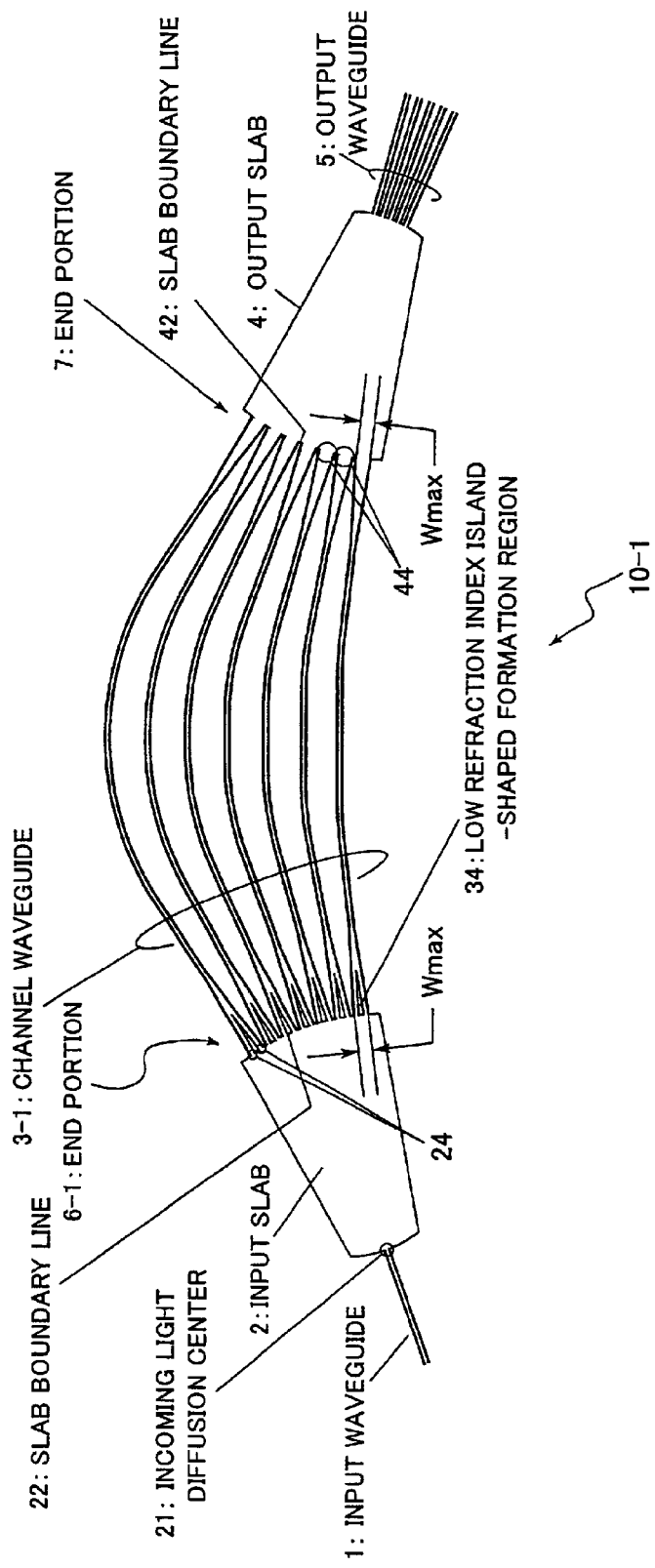
FIG. 6 is a schematic view showing a wavelength division multiplexing and demultiplexing apparatus which functions as a wavelength division demultiplexing apparatus according to a second embodiment of the present invention.

FIG. 6 shows principal components of a MUX/DEMUX 10-1 which functions as a wavelength division demultiplexing apparatus according to a second embodiment of the present invention and particularly shows a pattern of a core of optical waveguide devices which compose the MUX/DEMUX 10-1.

Also in the MUX/DEMUX 10-1 according to the second embodiment, similarly as in the MUX/DEMUX 10 of the first embodiment described hereinabove, a core is formed such that upper, lower and left, right portions thereof are surrounded by an under clad or an over clad so that light can be propagated in a confined state in the core.

While the MUX/DEMUX 10-1 according to the second embodiment is different in configuration of channel waveguides 3-1 thereof from that in the first embodiment (refer to reference numeral 10) described hereinabove, the remaining configuration thereof is similar to that in the first embodiment described above. In particular, the core has a pattern formed integrally thereon which functions as an input waveguide 1, an input slab 2, an output slab 4, and output waveguides 5 similar to those of the first embodiment described hereinabove in addition to the channel waveguides 3-1 which have a characteristic unique to the second embodiment.

In the second embodiment, each of the channel waveguides 3-1 is configured such that a neighboring portion thereof to a portion at which it is optically connected to the input slab 2, that is, an end portion 6-1 of each of the channel waveguides 3-1 adjacent the input slab 2, is formed as a tapering connection branch 62*a* (refer to FIG. 7) which has a width which is maximum at a connection portion of the end portion 6-1 to the input slab 2 and decreases in a tapering fashion as the distance from the input slab 2 increases. The connection portion of the channel waveguide 3-1 to the input slab 2 is formed such that it has a width Wmax greater than a minimum width with which higher-order mode light of wavelength division multiplexed light inputted to the connection portion is excited.

Further, in the proximity of the position of each of the channel waveguides 3-1 at which the channel waveguide 3-1 has the width with which higher-order mode light is excited, an island-shaped formation region 34 (refer to FIG. 7) surrounded by the area in which the channel waveguide 3-1 is formed and having a refractive index lower than that of the channel waveguide 3-1 is provided.

Figure 7:
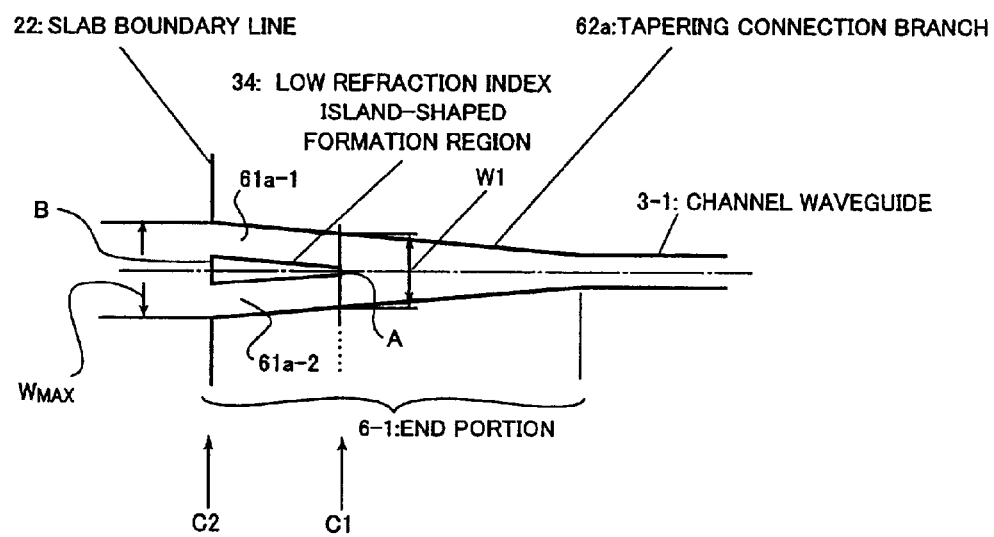
FIG. 7 is a schematic view showing part of the wavelength division multiplexing and demultiplexing apparatus of FIG. 6.

For example, as shown in FIG. 7, also the end portion 7 of each of the channel waveguides 3-1 is formed such that, similarly as with the end portion 6-1, the width thereof is set to the width Wmax at the connection portion thereof to the input slab 2 and decreases in a tapering fashion as the distance from the output slab 4 increases. Further, the island-shaped formation region 34 is formed at the end portion 6-1 of the channel waveguide 3-1 in such an island shape that it is surrounded by the area in which the channel waveguide 3-1 is formed to extend from a waveguide position C1 at which the channel waveguide 3-1 has an approximately minimum width with which higher-order mode light is excited to a position C2 on the slab boundary line 22.

As regards the width W1 of the channel waveguide 3-1 at the waveguide position C1 of the apex portion A of the island-shaped formation region 34, the channel waveguide 3-1 can be formed in a tapering fashion approximately with at least a width (for example, approximately 16 $\mu$m) with which higher-order mode light is excited such that the width of an intermediate portion thereof other than the end portions 6-1 and 7 is approximately 7 $\mu$m and the tapering connection branch 62*a* has a length of approximately 1.5 to 5 mm.

Further, the waveguides 61*a*-1 and 61*a*-2 partitioned by the island-shaped formation region 34 are formed as waveguides having a width with which higher-order mode (second-order mode) light of inputted wavelength division multiplexed light is cut off. Further, while the waveguides 61*a*-1 and 61*a*-2 join together at the waveguide position C1, the channel waveguide 3-1 at the joining position of the waveguides 61*a*-1 and 61*a*-2 has a waveguide width with which higher-order mode light of wavelength division multiplexed light inputted thereto is excited.

With the wavelength division demultiplexing apparatus of the second embodiment, since the distance between the nodes 24 at which the channel waveguides 3 and the input slab 2 are optically connected to each other is reduced, the amount of loss caused by the gap portions (such portions as that denoted by reference numeral 123 in FIG. 32(*c*)) is reduced. Further, similarly as in the case of the first embodiment described hereinabove, higher-order mode light is cut off by the two waveguides 61*a*-1 and 61*a*-2. Further, higher-order mode (first-order mode) light excited at the waveguide position C1 with incoming lines from the two waveguides 61*a*-1 and 61*a*-2 can cancel each other at the waveguide position C1, and therefore, loss by radiation of higher-order mode light is not generated, resulting in reduction of the loss.

Figure 8A:
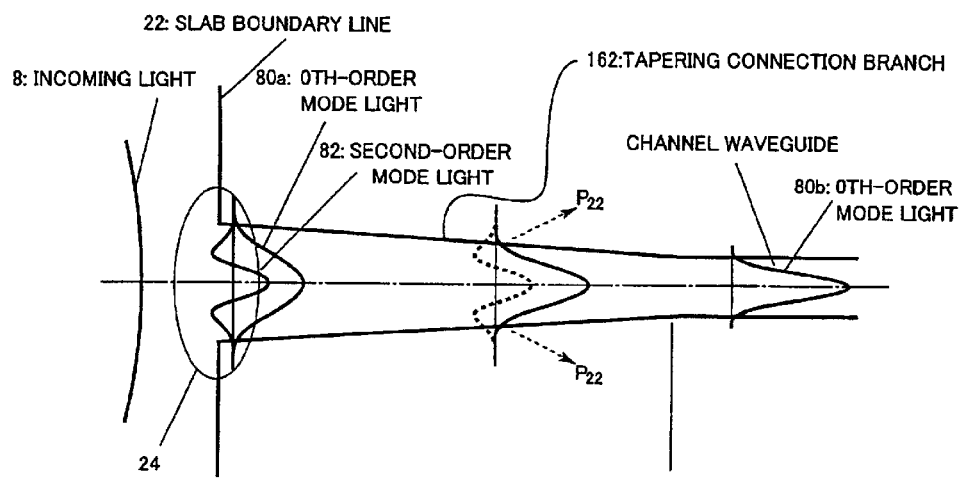
FIG. 8(a) is a schematic view illustrating propagation of light in a channel waveguide of a conventional wavelength division multiplexing and demultiplexing apparatus and FIG. 8(b) is a similar view but illustrating operation of the wavelength division multiplexing and demultiplexing apparatus of FIG. 6.
Figure 8B:
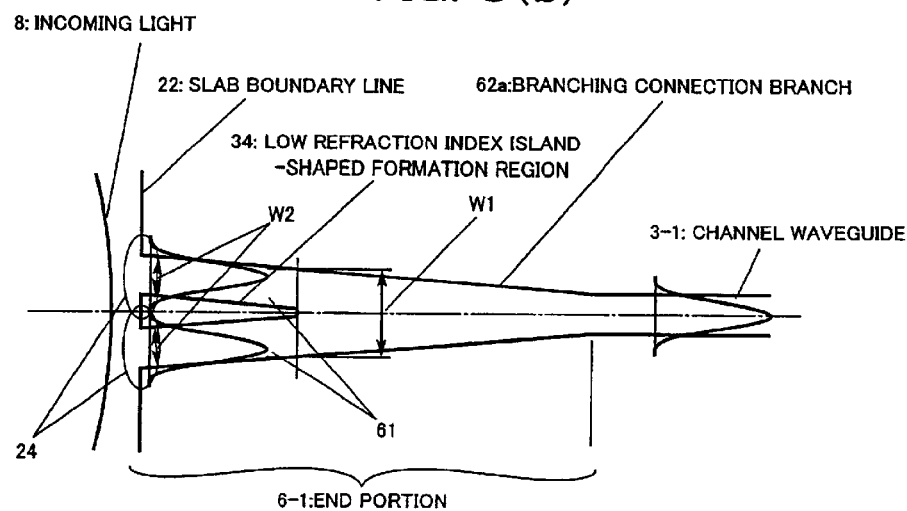

In the channel waveguides 3-1 shown in FIGS. 6 and 7, since the waveguides 61*a*-1 and 61*a*-2 as branching connection branches are formed from a waveguide having the reduced width W2 so that higher-order mode light may be cut off, when incoming light 8 is introduced into the waveguides 61*a*-1 and 61*a*-2 as seen in FIG. 8(*b*), no loss occurs in the waveguides 61*a*-1 and 61*a*-2 because only 0th-order mode light 80*a* propagates in them.

It is to be noted that FIG. 8(*a*) illustrates propagation of light in a channel waveguide of a conventional MUX/DEMUX.

Also in the MUX/DEMUX 10-1 which functions as a wavelength division demultiplexing apparatus according to the second embodiment of the present invention having the configuration described above, when light (wavelength division multiplexed light) including a plurality of wavelength components is inputted to the input waveguide 1, lights wavelength-demultiplexed (wavelength-split) for the individual channels are outputted from the channels #1 to #n of the output waveguides 5.

Further, since the angle pitch of wavelength division multiplexed light incoming to the end portions 6-1 of the channel waveguides 3 adjacent the input slab 2 (that is, the distance between angles at which the wavelength division multiplexed lights come into the channel waveguides 3) is reduced by the island-shaped formation regions 34, while a waveguide width with which higher-order mode light of the wavelength division multiplexed light is cut off is achieved, a cause of loss such as a gap portion [refer to reference numeral 123 of FIG. 32(*c*)] is reduced.

In particular, wavelength division multiplexed light incoming to the end portion 6-1 of each of the channel waveguides 3 adjacent the input slab 2 propagates in the channel waveguide 3 with higher-order mode light thereof cut off. On the other hand, since first-order mode lights cancel each other at the portion C1 at which the waveguides 61*a*-1 and 61*a*-2 join together, only 0th-order mode light propagates in the channel waveguide 3 and the loss of the wavelength division multiplexed light is reduced.

In this manner, with the wavelength division demultiplexing apparatus according to the second embodiment of the present invention, since the distances between the nodes at which the channel waveguides 3-1 and the input slab 2 are optically coupled to each other are reduced, or in other words, since the angle pitch of wavelength division multiplexed lights inputted to the end portions 6-1 of the channel waveguides 3-1 adjacent the input slab 2 is reduced, the connection loss between the input slab 2 and the channel waveguides 3-1 can be reduced.

(c) Third Embodiment

FIG. 9 shows principal components of a MUX/DEMUX 10-2 which functions as a wavelength division demultiplexing apparatus according to a third embodiment of the present invention and particularly shows a pattern of a core of optical waveguide devices which compose the MUX/DEMUX 10-2.

Also in the MUX/DEMUX 10-2 according to the third embodiment, similarly as in the embodiments described hereinabove, a core is formed such that upper, lower and left, right portions thereof are surrounded by an under clad or an over clad so that light can be propagated in a confined state in the core.

While the MUX/DEMUX 10-2 according to the third embodiment is different in configuration of channel waveguides 3-2 thereof from that in the embodiments (refer to reference characters 10 and 10-1) described hereinabove, the remaining configuration thereof is similar to that in the embodiments described above. In particular, the core has a pattern formed integrally thereon which functions as an input waveguide 1, an input slab 2, an output slab 4, and output waveguides 5 similar to those of the embodiments described hereinabove in addition to the channel waveguides 3-2 which have a characteristic unique to the third embodiment.

Figure 10:
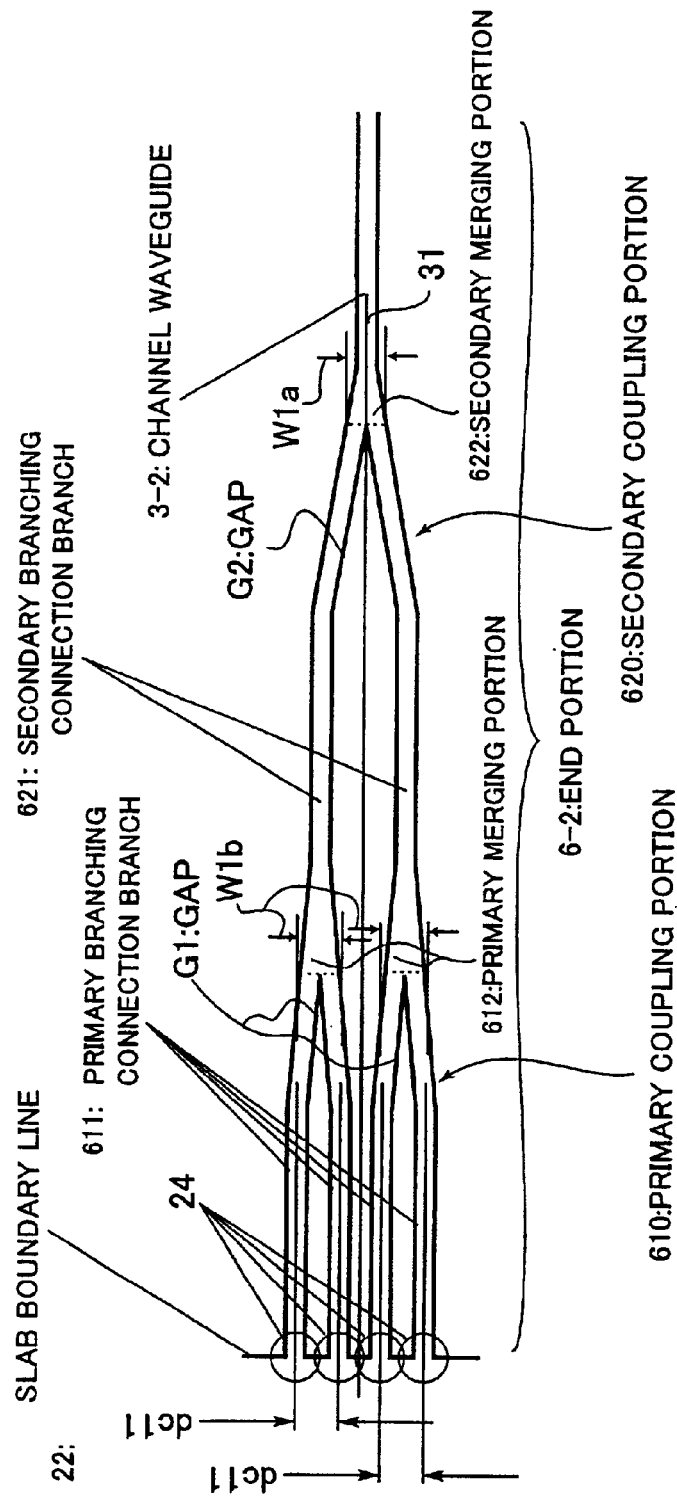
FIG. 10 is a schematic view showing part of the wavelength division multiplexing and demultiplexing apparatus of FIG. 9.

In particular, as shown in FIG. 10, an end portion 6-2 of each of the channel waveguides 3-2 has a pair of primary coupling portions 610 including four primary branching connection branches 611 for receiving wavelength division multiplexed light from the input slab 2 and two primary merging portions 612 for optically coupling the wavelength division multiplexed lights from the primary branching connection branches 611, and a secondary coupling portion 620 including two secondary branching connection branches 621 for receiving the wavelength division multiplexed lights coupled by the primary coupling portions 610 and a secondary merging portion 622 for optically coupling the wavelength division multiplexed lights from the secondary branching connection branches 621, both formed integrally with each other.

In particular, in the MUX/DEMUX 10-2 in the third embodiment, each of the channel waveguides 3-2 is formed integrally with the input slab 2 at four nodes. In other words, each of the primary coupling portions 610 and the secondary coupling portion 620 is formed as a coupling waveguide for optically coupling a plurality of wavelength division multiplexed lights and propagating the resulting wavelength division multiplexed light, and the primary coupling portions 610 and the secondary coupling portion 620 each serving as a coupling waveguide are connected in tandem like a tree of two stages.

The four primary branching connection branches 611 of each of the channel waveguides 3-2 are formed such that a center axis 31 (refer to FIG. 10) thereof at the end portion 6 of the channel waveguide 3-2 adjacent the input slab 2 passes the center of a gap portion G2 positioned between two primary branching connection branches 611 and an extension line of the center axis 31 passes an incoming light diffusion center 21 (refer to FIG. 9). In other words, the center axis 31 of the end portion 6-2 of each of the channel waveguides 3-2 coincides with the optical axis of incoming light.

It is to be noted that, in FIG. 10, the width of the primary branching connection branches 611 can be set to approximately 7 μm, and the distance dc11 between the primary branching connection branches 611 can be set to approximately 16 μm.

In particular, in the channel waveguide 3-2 shown in FIGS. 9 and 10, since the primary branching connection branches 611 and the primary merging portions 612 as branching connection branches are each formed from a waveguide of a fixed width of, for example, approximately 7 μm so that higher-order mode light may be cut off, for example, if incoming light enters the primary branching connection branches 611, then since only the 0th mode light is permitted to propagate in the primary branching connection branches 611, no loss occurs there.

Similarly, while the secondary branching connection branches 621 of the secondary coupling portion 620 propagate only wavelength division multiplexed lights from the primary coupling portions 610, since each of the secondary branching connection branches 621 is formed from a waveguide of a fixed width of, for example, approximately 27 μm, it propagates only the 0th mode light. It is to be noted that each of the primary merging portions 612 and the secondary merging portion 622 is formed, similarly to the corresponding portions (refer to reference numeral 69 in FIGS. 1 to 5) in the first embodiment described hereinabove, with a width with which higher-order mode (first-order mode) lights excited from wavelength division multiplexed lights from the primary branching connection branches 611 and 621 on the upstream side can cancel each other.

With the wavelength division demultiplexing apparatus according to the third embodiment of the present invention, since the distance between the nodes 24 between the input slab 2 and the channel waveguides 3 can be further reduced, the amount of loss caused by the gap portions (such portions as that denoted by reference numeral 123 in FIG. 32(c)) can be reduced. In addition, the channel waveguide distance between connection portions 44 between the output slab 4 and the channel waveguides 3-2 can be increased when compared with that in the embodiments described hereinabove, and the interference of light at the end portions 7 of the channel waveguides 3-2 can be further suppressed. Thus, the wavelength division demultiplexing apparatus is effective for prevention of interference (coupling) of light where waveguides having a comparatively small refractive index difference with which interference (coupling) of light is likely to occur.

Further, while, in the third embodiment described above, the end portion 6-2 of each of the channel waveguides 3-2 has primary coupling portions 610 and a secondary coupling portion 620 connected in tandem in a tree-like configuration of two stages, according to the present invention, the end portion 6-2 is not limited to the specific configuration, and the end portion 6-2 may otherwise be configured using a configuration similar to the configuration of the primary coupling portions 610 and the secondary coupling portion 620 described above as coupling waveguides such that such coupling portions are connected in tandem in a tree-like configuration of more than two stages.

Figure 11:
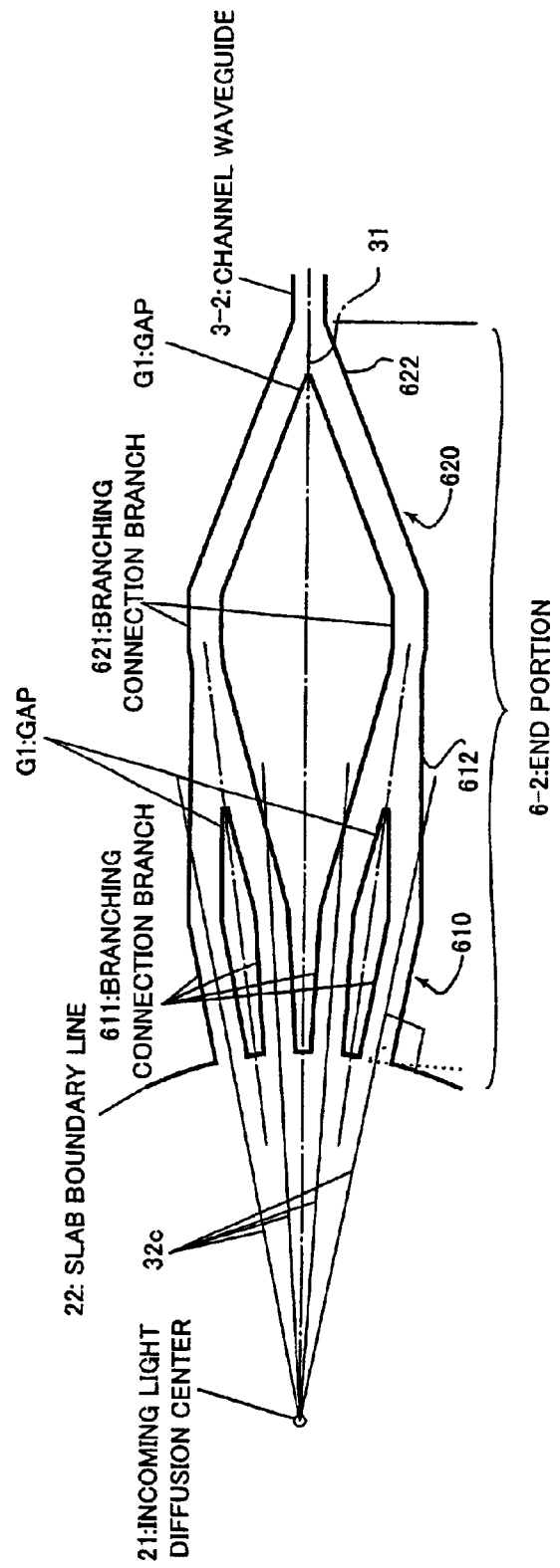
FIG. 11 is a schematic view showing part of a wavelength division multiplexing and demultiplexing apparatus according to a modification to the wavelength division multiplexing and demultiplexing apparatus of FIG. 9.

Further, in the MUX/DEMUX 10-2 which functions as a wavelength division demultiplexing apparatus according to the third embodiment described above, for example, each of the primary branching connection branches 611 may be formed such that a center axis 32c thereof coincides with the optical axis of incoming light from the incoming light diffusion center 21 as shown in FIG. 11. The configuration just described provides advantages similar to those of the configuration described above with reference to FIG. 11.

(d) Fourth Embodiment

Figure 12:
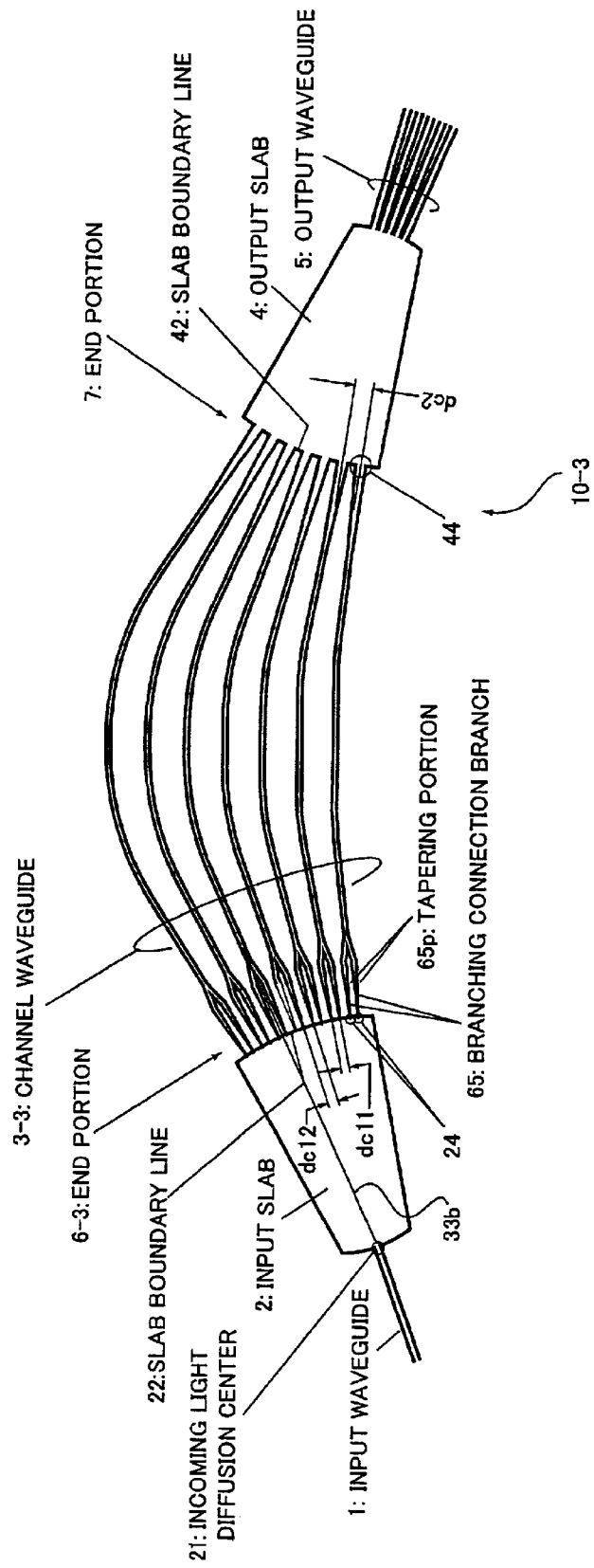
FIG. 12 is a schematic view showing a wavelength division multiplexing and demultiplexing apparatus which functions as a wavelength division demultiplexing apparatus according to a fourth embodiment of the present invention.
Figure 13:
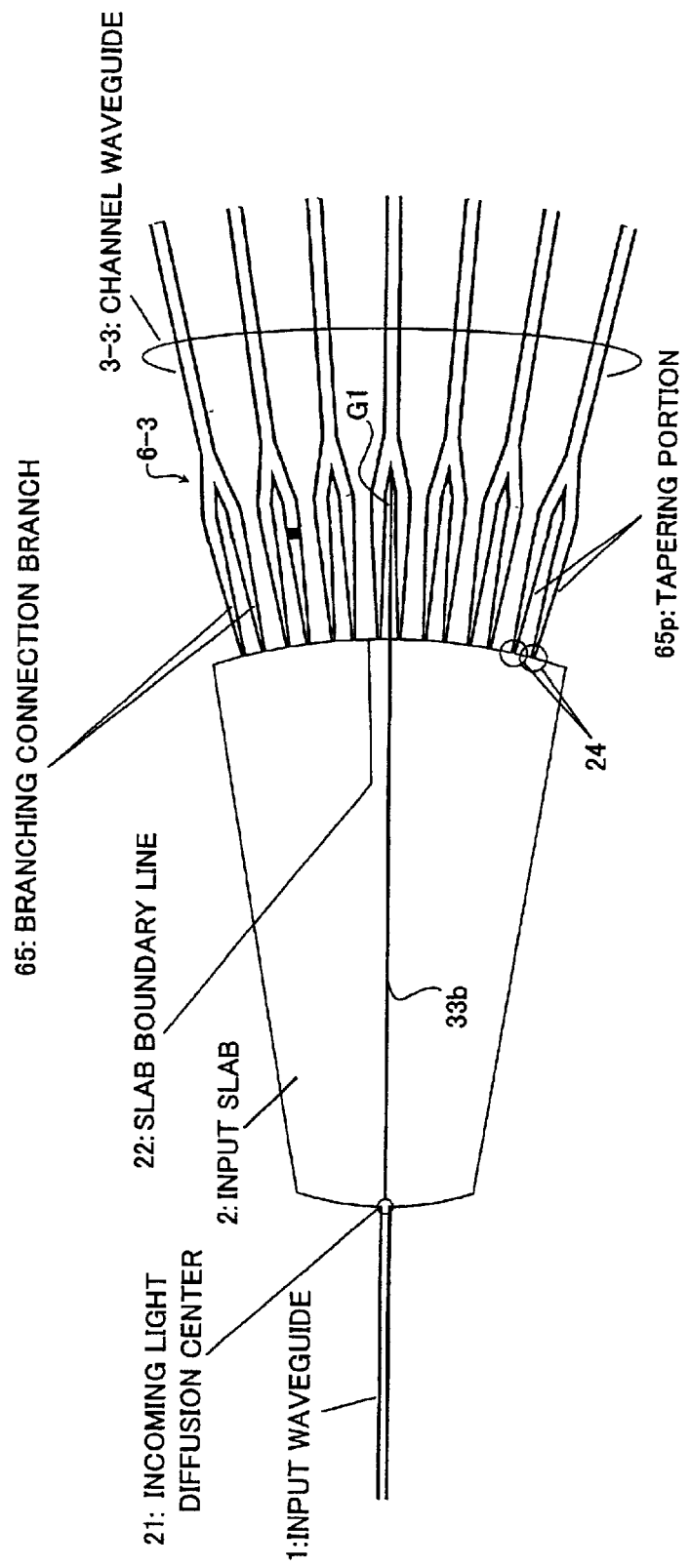
FIGS. 13 and 14 are schematic views showing part of the wavelength division multiplexing and demultiplexing apparatus of FIG. 12.
Figure 14:
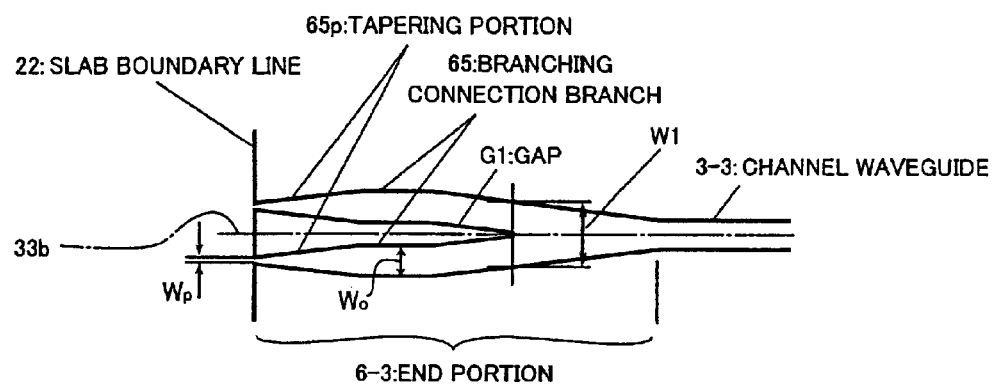

FIGS. 12 to 14 show a fourth embodiment of the present invention. More particularly, FIG. 12 schematically shows principal components of a MUX/DEMUX 10-3 which functions as a wavelength division demultiplexing apparatus according to the fourth embodiment of the present invention and particularly shows a pattern of a core of optical waveguide devices which compose the MUX/DEMUX 10-3. FIG. 13 schematically shows part of an input waveguide 1, an input slab 2 and channel waveguides 3-3 in an enlarged scale, and FIG. 14 schematically shows an end portion 6-3 of one of the channel waveguides 3-3 adjacent the input slab 2.

Also in the MUX/DEMUX 10-3 according to the fourth embodiment, similarly as in the embodiments described hereinabove, a core is formed such that upper, lower and left, right portions thereof are surrounded by an under clad or an over clad so that light can be propagated in a confined state in the core.

While the MUX/DEMUX 10-3 according to the fourth embodiment is different in configuration of the channel waveguides 3-3 thereof from that in the first embodiment (refer to reference character 10) described hereinabove, the remaining configuration thereof is similar to that in the embodiments described above. In particular, the core has a pattern formed integrally thereon which functions as an input waveguide 1, an input slab 2, an output slab 4, and output waveguides 5 similar to those of the embodiments described hereinabove in addition to the channel waveguides 3-3 which have a characteristic unique to the fourth embodiment.

Each of the channel waveguides 3-3 in the fourth embodiment has a characteristic core pattern at a portion thereof in the proximity of a portion at which it is optically connected to the input slab 2, that is, an end portion 6-3 thereof adjacent the input slab 2.

In particular, the end portion 6-3 of each of the channel waveguides 3-3 of the MUX/DEMUX 10-3 (refer to FIG. 12 or 13) of the fourth embodiment has, as shown in FIG. 14, a pair of tapering portions 65p each having a width which is a small width $W_p$ at the node 24 to the input slab 2 and increases up to $W_o$ as the distance from the input slab 2 increases. Here, if the width $W_o$ is set to 7 µm and the width $W_p$ is set to 2 µm, then the amount of connection loss between the input slab 2 and the channel waveguide 3 can be reduced when compared with that in the first or second embodiment.

Thus, each of the branching connection branches 65 has a tapering portion 65p having a pattern wherein the width decreases in a tapering fashion as the distance to the input slab 2 decreases. In other words, the channel waveguides 3-3 each having two branching connection branches 65 each having a tapering portion 65p and a merging portion 69 at the end portion 6-3 thereof are formed integrally with the input slab 2 such that the input slab 2 and the channel waveguides 3-3 are optically connected to each other.

It is to be noted that the branching connection branches 65 are formed such that, as shown in FIG. 14, a center axis 33b at the end portion 6-3 of each of the channel waveguides 3-3 passes the center of a gap portion G1 positioned between the two branching connection branches 65 and an extension line of the center axis 33b passes an incoming light diffusion center 21.

Figure 15A:
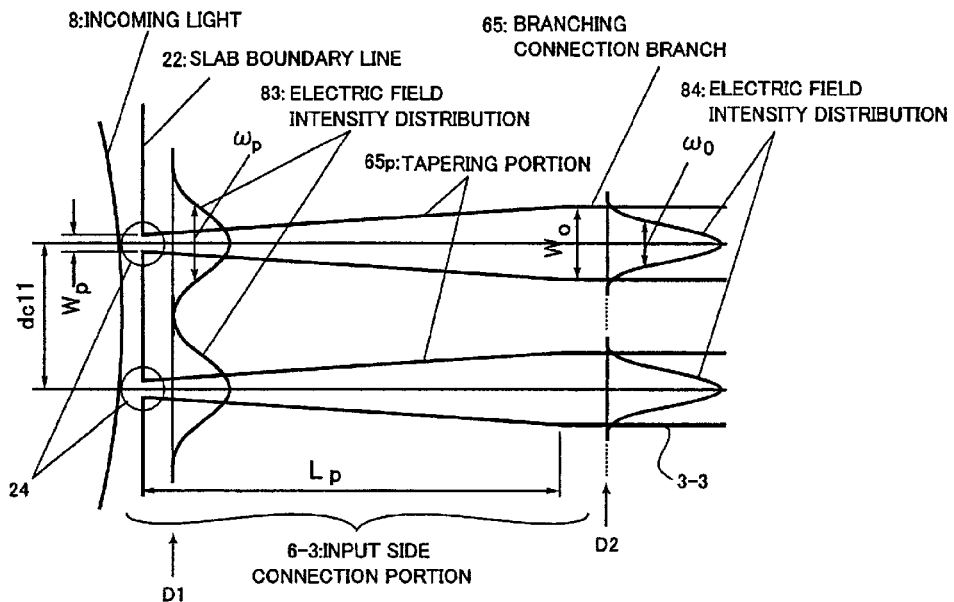
FIG. 15(a) is a schematic view illustrating operation of an input side node of the wavelength division multiplexing and demultiplexing apparatus of FIG. 12
Figure 15B:
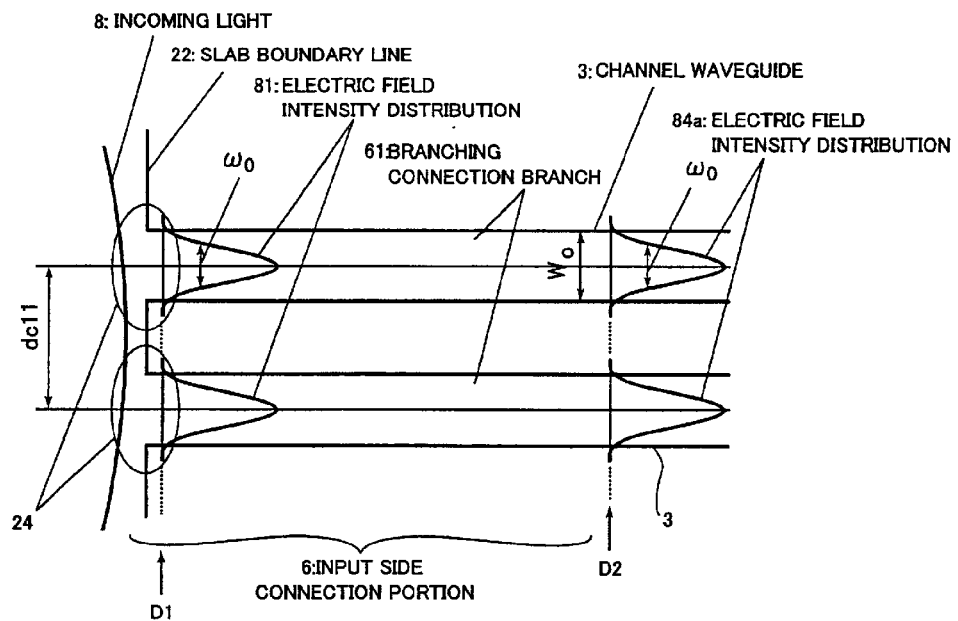
FIG. 15(b) is a similar view but illustrating operation of an input side node of the wavelength division multiplexing and demultiplexing apparatus of FIG. 1.

Now, the reason why the connection loss between the input slab 2 and the channel waveguides 3 in the MUX/DEMUX of the fourth embodiment decreases is described through comparison between FIGS. 15(a) and 15(b).

FIG. 15(a) illustrates operation of an input side connection portion 6-3 of the MUX/DEMUX 10-3 (refer to FIG. 12) according to the fourth embodiment, and FIG. 15(b) illustrates operation of an input side connection portion 6 of the MUX/DEMUX 10 (refer to FIG. 1) in the first embodiment.

Since the core width of each of the branching connection branches 61 in FIG. 15(b) is 7 µm fixed, the intensity distribution 81 of electric field at an end portion D1 of the branching connection branch 61 is same as the intensity distribution 84a of electric field at another portion D2 of the branching connection branch 61. In this instance, the coupling efficiency between the input slab 2 and the channel waveguide 3 of the MUX/DEMUX 10 of the first embodiment is equal to an integration over the area of overlap between the normalized optical fields 24 and 81 of the intensity 24 of electric field of light immediately before incoming to the channel waveguide 3 and the intensity 24 of electric field of 0th-order mode light propagating in the branching connection branches of the channel waveguide 3. It is to be noted that this calculation method is disclosed, for example, in "IEEE JOURNAL OF QUANTUM ELECTRONICS, VOL. 28 No. 12, p.2729 (1992)".

Since the intensity 24 of electric field is an intensity distribution of electric field of light diffused by the input slab 2, the width of it is great. In contrast, since the intensity 81 of electric field is a mode excited in the core 51 whose width is 7 µm, the width of it is small.

In this manner, as the ratio in width between intensities of electric fields to be coupled increases, the coupling loss increases.

In contrast, since the end portion of each of the branching connection branches 61 employed in the MUX/DEMUX 10-3 of the fourth embodiment is small in width, the waveguide mode excited at the end portion is great in width. As a result, the ratio in width between the intensity 24 of electric field and the intensity distribution 82 of electric field becomes small, and the coupling loss is reduced.

On the other hand, where a wavelength division demultiplexing apparatus includes the branching connection branches 65 each having the tapering portion 65p as in the fourth embodiment, incoming light emitted from the input waveguide 1 and propagating in the input slab 2 until it comes to the slab boundary line 22 exhibits such an intensity distribution 8 of electric field as seen in FIG. 15(a). Further, waveguide mode light excited at an end portion D1 of each of the branching connection branches 65 has such an intensity distribution 83 of electric field, and waveguide mode light excited at a portion D2 of the branching connection branch 65 at which the tapering portion 65p comes to an end has such an intensity distribution 84 of electric field as seen in FIG. 15(a).

It is to be noted that, while, in FIG. 15(b), each of the branching connection branches 65 is formed such that the width thereof increases as the distance from the end portion D1 increases along the tapering portion 65p, the waveguide width $W_o$ at the portion D2 at which the increase of the width along the tapering portion 65p comes to an end is set to approximately 7 µm, the waveguide width $W_p$ at the end portion D1 to approximately 2 µm, and the length Lp of the tapering portion 65p to approximately 2.5 mm.

Here, since each of the channel waveguides in the present embodiment is formed from a single mode waveguide, it has a characteristic that the electric field distribution expands if the waveguide width becomes smaller than approximately ½. In particular, as seen from FIGS. 15(a) and 15(b), the intensity distribution 83 of electric field at the end portion D1 of the branching connection branch 65 is wider than the intensity distribution 81 of electric field at a corresponding portion of the branching connection branch 61 (that is, the waveform of the intensity distribution becomes flattened).

It is to be noted that the intensity distributions

It is to be noted that the intensity distributions 81 and 84a of electric field at the end portions D1 and D2 of the branching connection branch 61 and the intensity distribution 84 of electric field at the end portion D2 of the branching connection branch 65 are same in width and shape since the core widths of the portions at which excitation occurs are equal to one another.

Here, the coupling efficiencies of light of the branching connection branches 61 and 65 on the slab boundary line 22 are equal to superposition integration values of the intensity distribution 8 of electric field of incoming light and the intensity distributions 81 and 83 of electric field of waveguide mode lights excited in the waveguide [refer to, for example, Kenji Kono, "Foundations and Applications of Optical Coupling Systems for Optical Devices", Gendai Kogaku-Sha, p31, expression (3.1–7)]. Through the supervision integration, a result is obtained that the configuration of the branching connection branches 65 exhibits a higher coupling efficiency than the configuration of the branching connection branches 61.

Accordingly, where the branching connection branches 65 each having the tapering portion 65p are formed, the connection loss between the input slab 2 and the channel waveguides 3-3 on the slab boundary line 22 can be reduced when compared with that where branching connection branches are formed without having the tapering portion 65p.

In this manner, with the wavelength division demultiplexing apparatus according to the fourth embodiment of the present invention, since a portion of each of the channel waveguides 3-3 in the proximity of a portion at which it is optically connected to the input slab 2 has integrally formed thereon two branching connection branches 65 and a merging portion 69 for optically coupling wavelength division multiplexed lights from the branching connection branches 65, similar advantages to those of the first embodiment described above are achieved. Further, since each of the branching connection branches 65 is formed so as to have, at the tapering portion 65p thereof, a width which decreases in a tapering fashion as the distance to the input slab 2 decreases, the connection loss between the input slab 2 and each of the channel waveguides 3 can be reduced when compared with that where otherwise the branching connection branches 65 do not have the tapering portion 65p.

It is to be noted that, while, in the fourth embodiment described above, the center axis 33b of the end portion 6-3 of each of the channel waveguides 3-3 coincides with the optical axis of incoming light, according to the present invention, each of the branching connection branches 65 may be formed such that a center axis 33a thereof is disposed on an extension line from the diffusion center 21.

Figure 16:
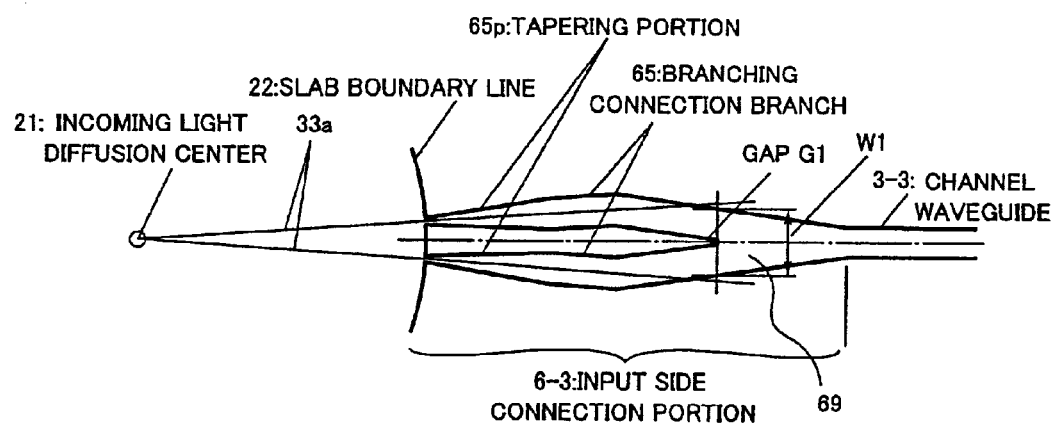
FIG. 16 is a schematic view showing part of a wavelength division multiplexing and demultiplexing apparatus according to a modification to the wavelength division multiplexing and demultiplexing apparatus of FIG. 12.

In other words, the branching connection branches 65 of the channel waveguides 3-3 shown in FIG. 16 are disposed such that the center axis 33a of each of them intersects perpendicularly with a tangential line to the arc of the slab boundary line 22. Where the branching connection branches 65 are formed in this manner, the coupling loss can be further reduced and the incoming efficiency of wavelength division multiplexed light can be further raised when compared with those of the embodiment described hereinabove.

Figure 17:
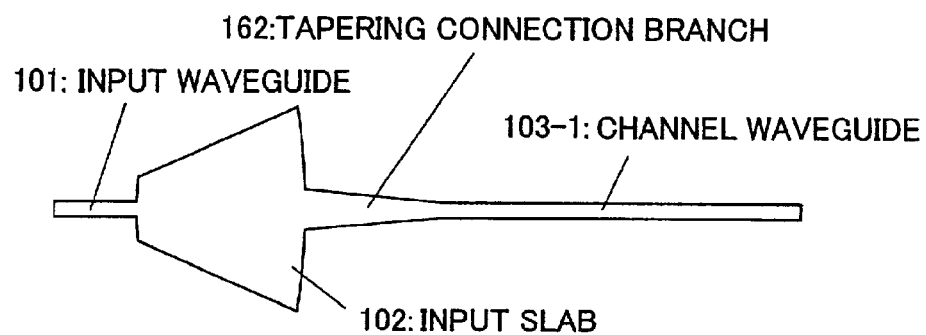
FIG. 17 is a schematic view illustrating propagation of light in a channel waveguide of a conventional wavelength division multiplexing and demultiplexing apparatus.

Operation of the MUX/DEMUX 10-3 according to the present invention and operation of a conventional MUX/DEMUX are described in comparison with each other with reference to FIG. 17. FIG. 17 shows a core pattern corresponding to the manner of propagation of light. Here, when laser light is inputted from the input waveguide 101, the light propagates into the input slab 102 and one waveguide (channel waveguide 103-1) having characteristics similar to those of the channel waveguide 103-1. Further, the color varies like deep blue→yellow→deep red (not shown) in proportion to the intensity of propagated light.

When laser light is inputted to the input waveguide 101, the light is propagated into the channel waveguide 103-1 through the input slab 102. Thereupon, at a portion of the channel waveguide 103-1 at which the tapering connection branch 162 has a reduced width, higher-order mode is radiated.

Figure 18:
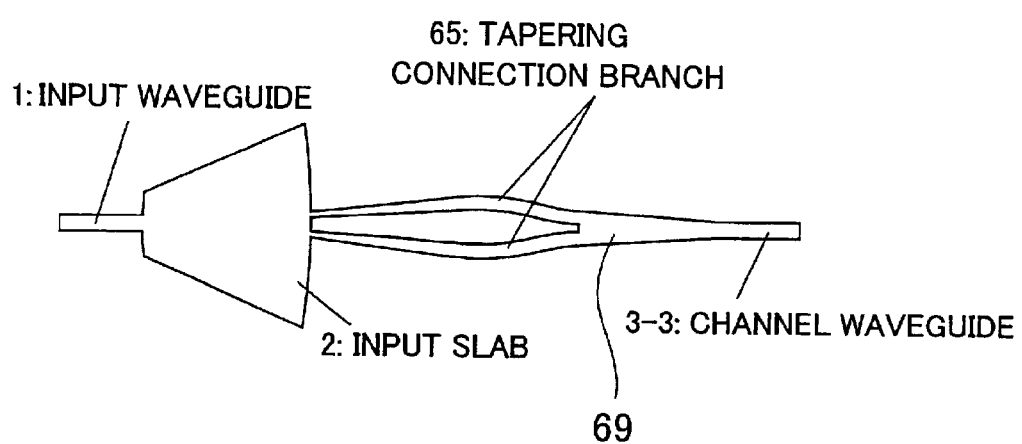
FIG. 18 is a schematic view illustrating operation of the modified wavelength division multiplexing and demultiplexing apparatus of FIG. 16.

Then, when laser light is inputted from the input waveguide 1 shown in FIG. 12, the light propagates into the input slab 2 and one waveguide (channel waveguide 3-3) having characteristics similar to those of the channel waveguide 3-3. Thereupon, the color varies like deep blue→yellow→deep red in proportion to the intensity of propagated light. FIG. 18 shows a core pattern corresponding to the manner of propagation of light.

In the configuration shown in FIG. 18, light propagating in the channel waveguide 3-3 through the input slab 2 is radiated but by a much reduced light amount to the outside of the core from the branching connection branch 65 when compared with light propagating in the channel waveguide 103-1, and the light loss can be reduced significantly. In this instance, the light loss in the configuration shown in FIG. 17 is approximately −16.4 dB and the light loss in the configuration of FIG. 18 is approximately −14.7 dB, and a loss reduction effect by approximately 1.7 dB is obtained.

According to a simulation, the wavelength division demultiplexing apparatus 10-3 according to the fourth embodiment exhibited a loss reduction effect of 1.7 dB when compared with that of a conventional wavelength division demultiplexing apparatus (refer to FIG. 28).

(e) Fifth Embodiment

Figure 19:
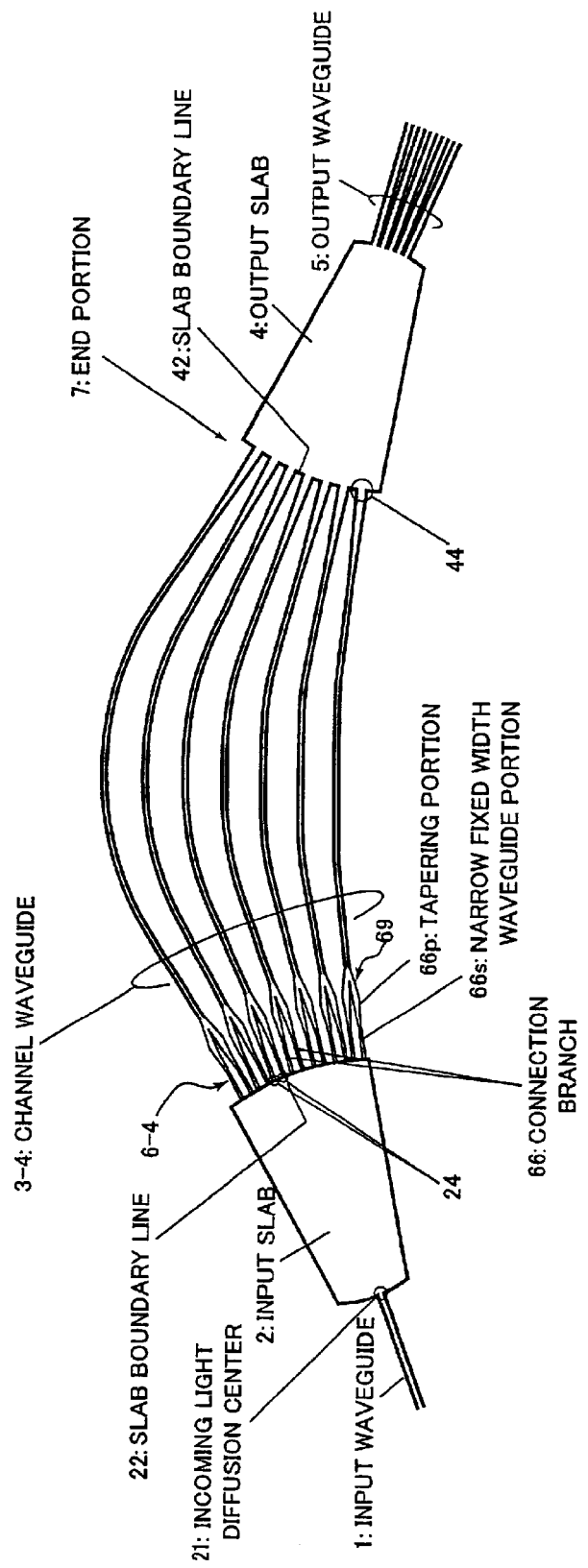
FIG. 19 is a schematic view showing a wavelength division multiplexing and demultiplexing apparatus which functions as a wavelength division demultiplexing apparatus according to a fifth embodiment of the present invention.
Figure 20:
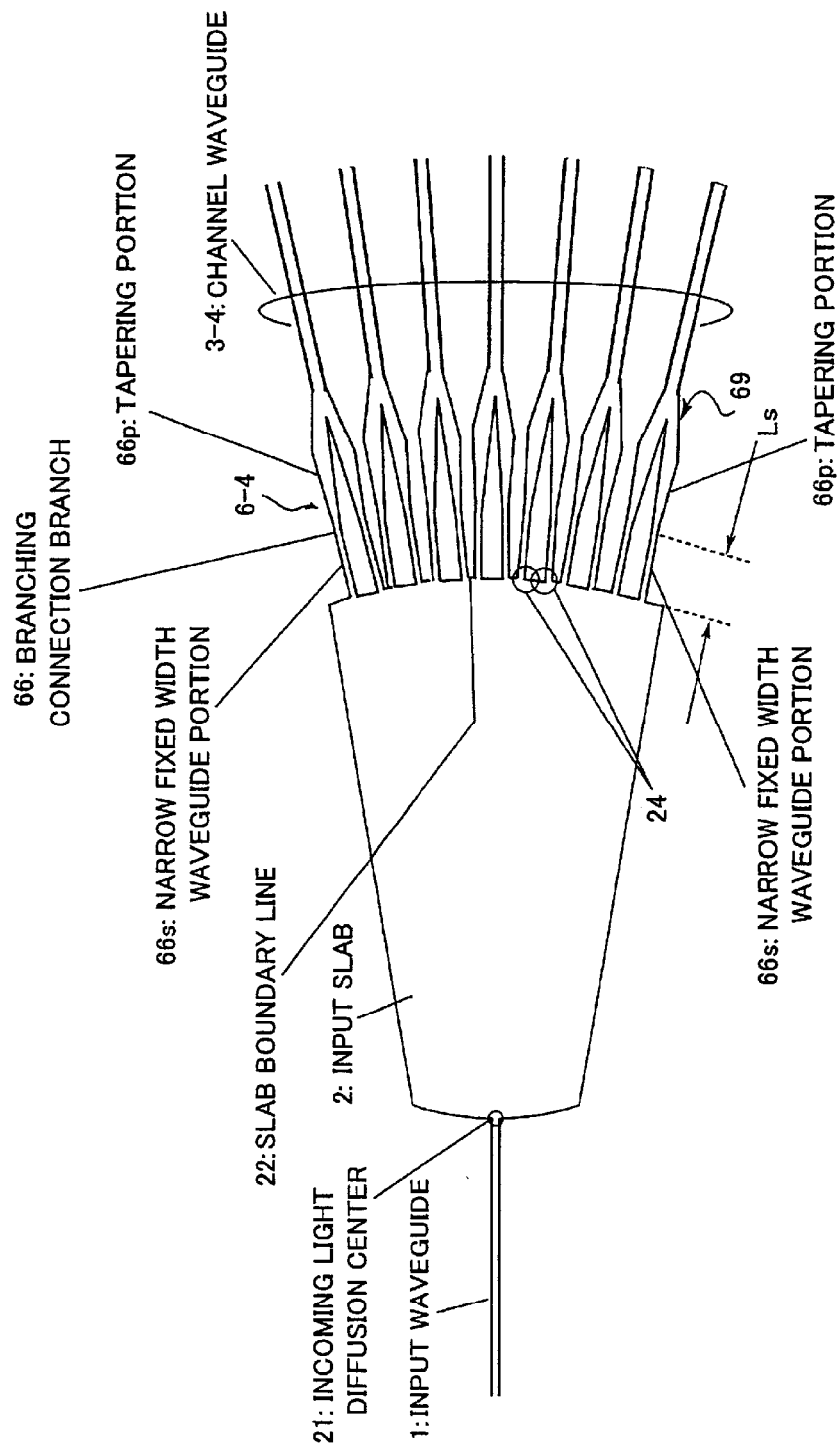
FIGS. 20 and 21 are schematic views showing part of the wavelength division multiplexing and demultiplexing apparatus of FIG. 19.
Figure 21:
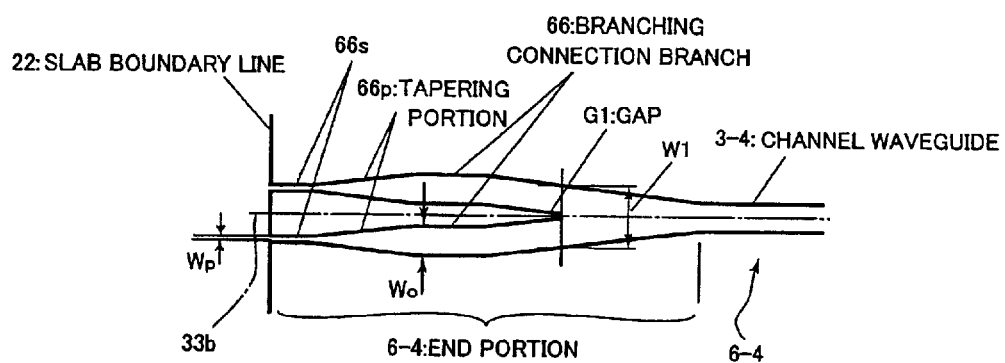

FIGS. 19 to 21 show a fifth embodiment of the present invention. More particularly, FIG. 19 schematically shows principal components of a MUX/DEMUX 10-4 which functions as a wavelength division demultiplexing apparatus according to the fourth embodiment of the present invention and particularly shows a pattern of a core of optical waveguide devices which compose the wavelength division multiplexing and demultiplexing apparatus 10-4. FIG. 20 schematically shows part of an input waveguide 1, an input slab 2 and channel waveguides 3-4 in an enlarged scale, and FIG. 21 schematically shows an end portion 6-4 of one of the channel waveguides 3-4 adjacent the input slab 2.

Also in the MUX/DEMUX 10-4 according to the fifth embodiment, similarly as in the embodiments described hereinabove, a core is formed such that upper, lower and left, right portions thereof are surrounded by an under clad or an over clad so that light can be propagated in a confined state in the core.

While the MUX/DEMUX 10-4 according to the fifth embodiment is different in configuration of the channel waveguides 3-4 thereof from that in the fourth embodiment (refer to reference character 10-3) described hereinabove, the remaining configuration thereof is similar to that in the embodiments described above. In particular, the core has a pattern formed integrally thereon which functions as an input waveguide 1, an input slab 2, an output slab 4, and output waveguides 5 similar to those the channel waveguides 3-4 which have a characteristic unique to the fourth embodiment.

Each of the channel waveguides 3-4 in the fifth embodiment has a characteristic core pattern at a portion thereof in the proximity of a portion at which it is optically connected to the input slab 2, that is, an end portion 6-4 thereof adjacent the input slab 2.

In particular, the end portion 6-4 of each of the channel waveguides 3-4 of the MUX/DEMUX 10-4 (refer to FIG. 19 or 20) according to the fifth embodiment has, as shown in FIG. 21, a pair of portions 66s having a width which is a small width $W_p$ at the node 24 to the input slab 2 and is fixed over a fixed distance from the input slab 2, and a pair of tapering portions 66p each having a width which increases up to $W_o$ as the distance from the input slab 2 increases.

Here, if the width $W_o$ is set to 7 μm and the width $W_p$ is set to 2 μm, then the amount of connection loss between the input slab 2 and the channel waveguide 3 can be reduced when compared with that in the fourth embodiment.

The tapering portion 66p has a width which decreases in a tapering fashion as the distance to the input slab 2 from the merging portion 69 side decreases. The narrow fixed width waveguide portion 66s has a substantially fixed width substantially equal to the width of a minimum width portion of the tapering portion 66p and optically connects the input slab 2 and the tapering portion 66p to each other. the input slab 2 and the tapering portion 66p to each other.

It is to be noted that a center axis 31 of the end portion 6-4 of each of the channel waveguides 3-4 passes the center of a gap portion G1 positioned between the two branching connection branches 66 and an extension line of the center axis 33b passes the incoming light diffusion center 21. In other words, the center axis 33b of the end portion 6-4 of each of the channel waveguides 3-4 coincides with the optical axis of incoming light to the channel waveguide 3.

Further, in the wavelength division multiplexing and demultiplexing apparatus 10-4 according to the fifth embodiment, since each of the branching connection branches 66 has a tapering portion 66p and a narrow fixed width waveguide portion 66s, the connection loss between the input slab 2 and the channel waveguides 3-4 can be further reduced when compared with that of the wavelength division multiplexing and demultiplexing apparatus 10-3 which includes the branching connection branches 65 as in the fourth embodiment.

Here, the reason why the connection loss between the input slab 2 and the channel waveguides 3 in the MUX/DEMUX 10-4 according to the fifth embodiment decreases is described through comparison between FIGS. 22(a) and 22(b).

FIG. 22(a) illustrates operation of an input side connection portion 6-3 of the MUX/DEMUX according to the fifth embodiment, and FIG. 22(b) illustrates operation of an input side connection portion 6 of the MUX/DEMUX in the fourth embodiment.

Incoming light emitted from the input waveguide 1 and propagating in the input slab 2 until it comes to the slab boundary line 22 exhibits an intensity distribution 8 of electric field while waveguide mode light excited at the end portion D1 of the narrow fixed width waveguide portion 66s has an intensity distribution 83 of electric field. Further, waveguide mode light excited at the portion D2 at which the tapering portion 65p of the branching connection branch 65 terminals has an intensity distribution 84 of electric field.

Here, in the case of the branching connection branch 65 employed in the MUX/DEMUX 10 of the first embodiment, it exhibits its minimum width only just at the portion thereof on the slab boundary line 22 as seen in FIG. 22(b). In order for light propagating in the branching connection branch 65 to have an intensity distribution of electric field corresponding to the core width of 2 µm, it is necessary for the light to propagate in a core over a distance longer than at least the wavelength thereof. Here, it is practically necessary for the light to propagate in a core of a length greater than ten times the wavelength thereof.

However, since the length of the portion of the branching connection branch 65 shown in FIG. 22(b) whose width is 2 µm is infinitely proximate to 0 and shorter than the required length, the width of the intensity distribution of electric field of the mode excited in the proximity of the input slab 2 is smaller than the width of the intensity distribution of electric field excited in the core having a core width of 2 µm.

As a result, the coupling loss becomes greater than the coupling loss expected where the width of the branching connection branch 65 is 2 µm.

In contrast, in the case of FIG. 22(a) corresponding to the input side connection portion 6-4 in the fifth embodiment, the core width of the end portion of the branching connection branch 65 can be set to 2 µm fixed over a length greater than ten times the wavelength of the light. Accordingly, where the width of the branching connection branch 65 is 2 µm, the coupling loss can be reduced to a value expected therefore.

On the other hand, where a wavelength division demultiplexing apparatus includes the branching connection branches 66 each having the tapering portion 66p and the narrow fixed width waveguide portion 66s as in the fifth embodiment, incoming light emitted from the input waveguide 1 and propagating in the input slab 2 until it comes to the slab boundary line 22 exhibits such an intensity distribution 8 of electric field as seen in FIG. 22(a). Further, waveguide mode light excited at an end portion D1 of each of the branching connection branches 66 has such an intensity distribution 83a of electric field, and waveguide mode light excited at a portion D2 of the branching connection branch 66 at which the tapering portion 66p comes to an end has such an intensity distribution 84 of electric field as seen in FIG. 22(a).

It is to be noted that, while, in FIG. 22(a), the waveguide width W0 at the portion D2 at which the increase of the width along the tapering portion 66p comes to an end can be set to approximately 7 µm, the waveguide width Wp at the end portion D1 to approximately 2 µm, the length Lp of the tapering portion 66p to approximately 800 µm, and the length Ls of the narrow fixed width waveguide portion 66s to approximately 200 µm.

In the tapering portion 65p of the branching connection branch 65 and the tapering portion 66p of the branching connection branch 66, the electric field distribution guided in the waveguide varies continuously in accordance with the variation of the core width of the waveguide. Therefore, if the narrow fixed width waveguide portion 66s is provided such that the tapering portion 66p is formed with a smaller length than that of the tapering portion 65p, then the extent of electric field mode light (waveguide mode light) excited in the end portion D1 is greater than that in the case of the branching connection branch 65.

It is to be noted that, while, in the fifth embodiment described above, the center axis 33b of the end portion 6-4 of each of the channel waveguides 3-4 coincides with the optical axis of incoming light, according to the present invention, each of the branching connection branches 66a may be formed such that a center axis 33a thereof is disposed on an extension line from the incoming light diffusion center 21.

Figure 23:
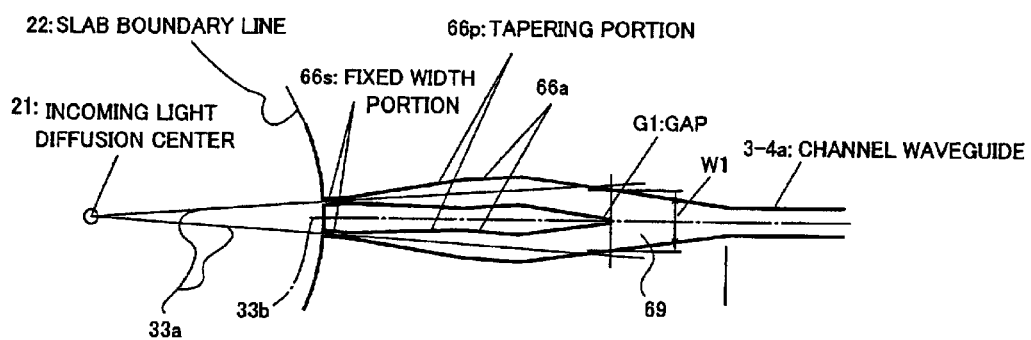
FIG. 23 is a schematic view showing part of a wavelength division multiplexing and demultiplexing apparatus according to a modification to the wavelength division multiplexing and demultiplexing apparatus of FIG. 19.

In other words, the branching connection branches 66a of the channel waveguides 3-4a shown in FIG. 23 are disposed such that the center axis 33a of each of them intersects perpendicularly with a tangential line to the arc of the slab boundary line 22. Where the branching connection branches 66a are formed in this manner, the coupling loss can be further reduced and the incoming efficiency of wavelength division multiplexed light can be further raised when compared with those of the embodiment described hereinabove.

(f) Others

In the MUX/DEMUX 10-2 which functions as a MUX/DEMUX according to the third embodiment described hereinabove, the primary branching connection branches 611 of the end portion 6-2 of each of the channel waveguides 3-2 are formed such that they have center axis 32b extending in parallel to each other and have a fixed width. According to the present invention, however, the end portion 6-2 of each of the channel waveguides 3-2 is not limited to the specific configuration. For example, such configurations of end portions 6-21 to 6-24 of each of channel waveguides 3-21 to 3-24 as shown in FIGS. 24 to 27 can be used.

Figure 24:
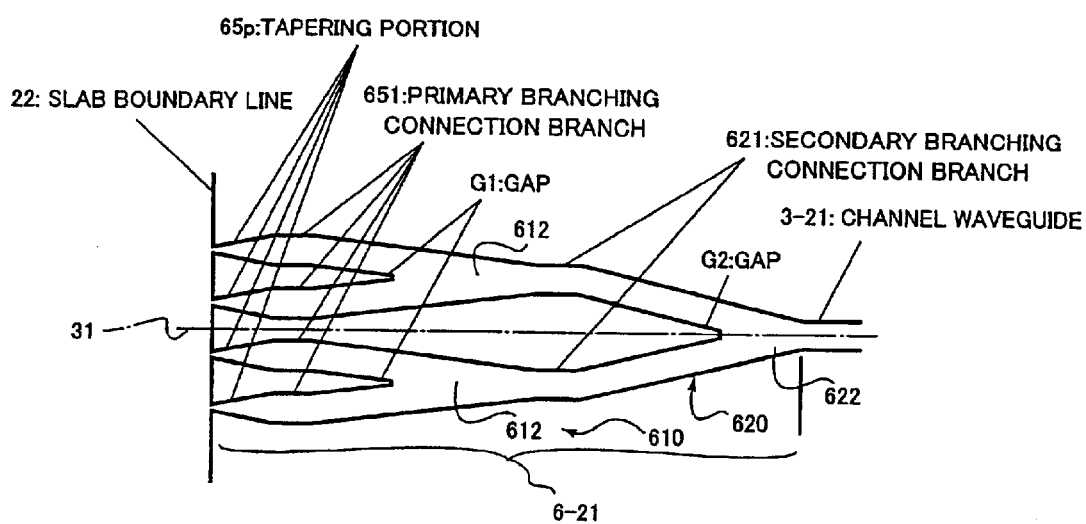
FIGS. 24 to 27 are schematic views showing several wavelength division multiplexing and demultiplexing apparatus which each functions as a wavelength division multiplexing and demultiplexing apparatus according to different embodiments of the present invention.

In particular, as seen in FIG. 24, the end portion 6-21 of each of the channel waveguides 3-21 may have primary branching connection branches 651 each having a tapering portion 65p similar to that described hereinabove with reference to FIGS. 12 to 14. This configuration provides similar advantages to those of the fourth embodiment described hereinabove.

Figure 25:
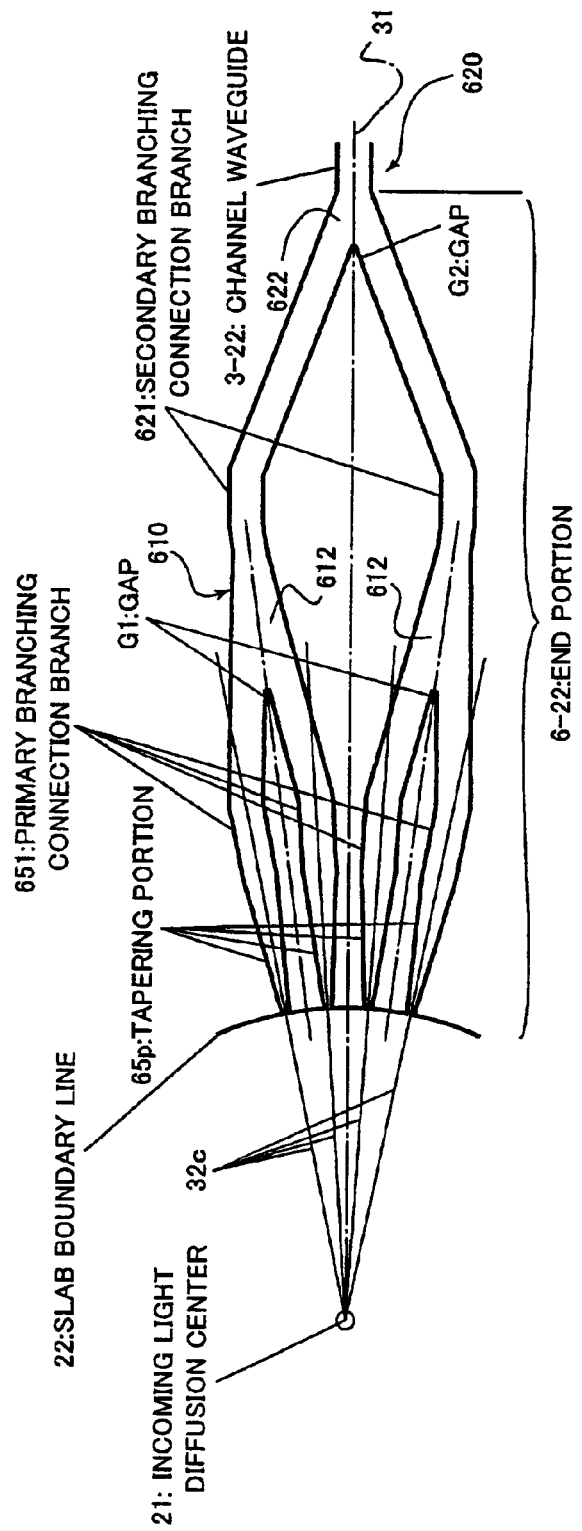

Further, for example, as shown in FIG. 25, each of the primary branching connection branches 651 of the end portion 6-22 of each of the channel waveguides 3-22 may be configured such that it has a tapering portion 65p similar to that in the fourth embodiment (refer to FIGS. 12 to 14) and has a center axis 32c which coincides with the optical axis of incoming light. This configuration provides advantages similar to those of the fourth embodiment. Further, the coupling loss between the input slab 2 and the channel waveguides 3-2 can be further reduced similarly as in the case of FIG. 11.

Figure 26:
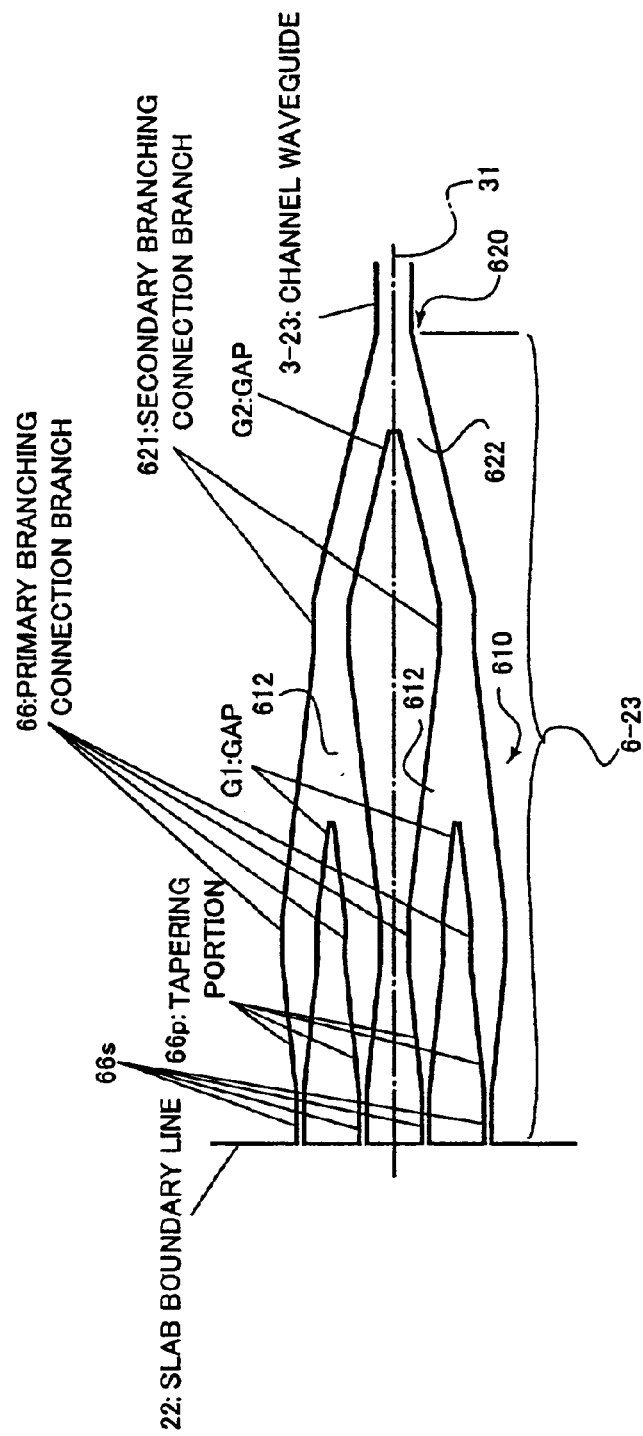

On the other hand, for example, as seen in FIG. 26, each of the primary branching connection branches 661 of the end portion 6-23 of each of the channel waveguides 3-23 may have a tapering portion 66p and a narrow fixed width waveguide portion 66s similar to those in the fifth embodiment (refer to FIGS. 19 to 21). Where this configuration is employed, advantages similar to those in the fifth embodiment described above can be achieved.

Figure 27:
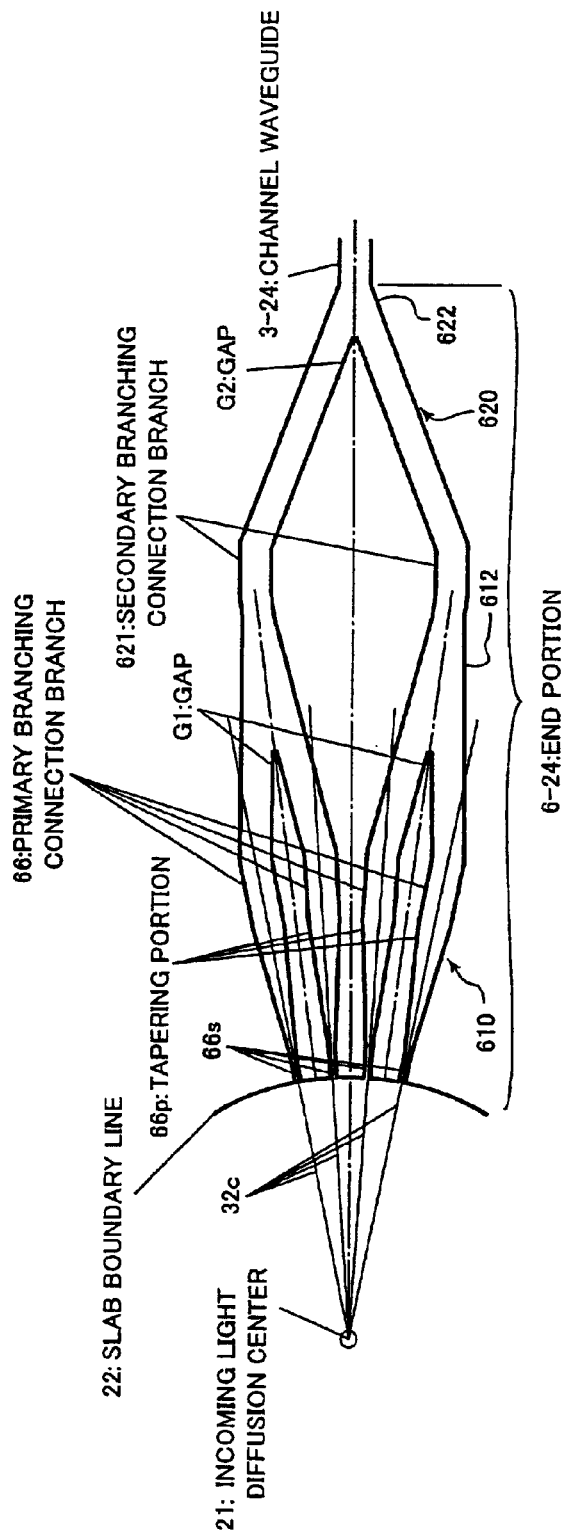

Furthermore, for example, as seen in FIG. 27, each of the primary branching connection branches 661 of the end portion 6-24 of each of the channel waveguides 3-24 may be configured such that it has a tapering portion 66p and a narrow fixed width waveguide portion 66s similar to those in the fifth embodiment (refer to FIGS. 19 to 21) and has a center axis 32 coincident with the optical axis of incoming light. This configuration provides advantages similar to those of the fifth embodiment. Further, the coupling loss between the input slab 2 and the channel waveguides 3-2 can be further reduced similarly as in the case of FIG. 11.

Further, the island-shaped formation region 34 in the second embodiment described hereinabove can naturally be applied to the channel waveguides in the other embodiments than the second embodiment.

The present invention is not limited to the embodiments specifically described above, and variations and modifications can be made without departing from the scope of the present invention.

What is claimed is:

1. A wavelength division demultiplexing apparatus, comprising:

a substrate;

a first waveguide, disposed on said substrate, for propagating wavelength division multiplexed light having a plurality of wavelength components;

a first slab, disposed on said substrate, for diffusing the wavelength division multiplexed light inputted from said first waveguide;

a plurality of channel waveguides, disposed on said substrate and having a series of different waveguide lengths increasing with a predetermined difference, for receiving and splitting the wavelength division multiplexed light diffused in said first slab to propagate split light, separately from each other channel waveguide;

a second slab, disposed on said substrate, for receiving the split light separately propagated through the plural channel waveguides and condensing the received wavelength division multiplexed light; and a second waveguide, disposed on said substrate, for propagating the light condensed by said second slab therein;

said channel waveguides and said first slab being optically connected to each other at a number of nodes greater than the number of nodes at which said channel waveguides and said second slab are connected to each other.

2. A wavelength division demultiplexing apparatus, comprising:

a substrate;

a first waveguide, disposed on said substrate, for propagating wavelength division multiplexed light having a plurality of wavelength components;

a first slab, disposed on said substrate, for diffusing the wavelength division multiplexed light inputted from said first waveguide;

a plurality of channel waveguides, disposed on said substrate and having a series of different waveguide lengths increasing with a predetermined difference, for receiving and splitting the wavelength division multiplexed light diffused in said first slab to propagate split light, separately from each other channel waveguide;

a second slab, disposed on said substrate, for receiving the split light separately propagated through the plural channel waveguides and condensing the received wavelength division multiplexed light; and a second waveguide, disposed on said substrate, for propagating the light condensed by said second slab therein;

each of said channel waveguides having, in the proximity of a portion thereof at which the channel waveguide is optically connected to said first slab, a plurality of branches or waveguides through core to which the wavelength division multiplexed light from said first slab is inputted and a merging portion formed integrally with said branches or waveguides through core for optically coupling the wavelength division multiplexed light from said branches or waveguides through core.

3. The wavelength division demultiplexing apparatus as claimed in claim 2, wherein each of said branches or waveguides through core has a width with which higher-order mode light of the wavelength division multiplexed light inputted thereto is cut off, the higher-order mode light being light of a mode or modes higher than the zero order mode, and a coupling contact at said merging portion is formed with a width with which the higher-order mode light of the distributed light inputted thereto can be excited.

4. The wavelength division demultiplexing apparatus as claimed in claim 2, wherein each of said branches or waveguides through core is formed with a width which decreases in a tapering fashion from a portion thereof adjacent said merging portion toward said first slab.

5. The wavelength division demultiplexing apparatus as claimed in claim 2, wherein each of said branches or waveguides through core has a tapering portion having a width which decreases in a tapering fashion from a portion thereof adjacent said merging portion toward said first slab and a fixed small width waveguide having a substantially fixed width substantially equal to the width of said tapering portion at a position at which said tapering portion has the smallest width for optically connecting said first slab and said tapering portion to each other.

6. The wavelength division demultiplexing apparatus as claimed in claim 3, wherein each of said branches or waveguides through core has a tapering portion having a width which decreases in a tapering fashion from a portion thereof adjacent said merging portion toward said first slab and a fixed small width waveguide having a substantially fixed width substantially equal to the width of said tapering portion at a position at which said tapering portion has the smallest width for optically connecting said first slab and said tapering portion to each other.

7. A wavelength division demultiplexing apparatus, comprising:

a substrate;

a first waveguide, disposed on said substrate, for propagating wavelength division multiplexed light having a plurality of wavelength components;

a first slab, disposed on said substrate, for diffusing the wavelength division multiplexed light inputted from said first waveguide;

a plurality of channel waveguides, disposed on said substrate and having a series of different waveguide lengths increasing with a predetermined difference, for receiving and splitting the wavelength division multiplexed light diffused in said first slab to propagate split light, separately from each other channel waveguide;

a second slab, disposed on said substrate, for receiving the split light separately propagated through the plural channel waveguides and condensing the received wavelength division multiplexed light; and a second waveguide, disposed on said substrate, for propagating the light condensed by said second slab therein;

each of said channel waveguides having, in the proximity of a portion thereof at which the channel waveguide is optically connected to said first slab, a plurality of sets of primary coupling portions each including a plurality of primary branching connection branches for receiving the wavelength division multiplexed light from said first slab and a primary merging portion for optically coupling the wavelength division multiplexed light from said primary branching connection branches, and a secondary coupling portion including a plurality of secondary branching connection branches for receiving the wavelength division multiplexed light coupled by said primary coupling portions and a secondary merging portion for optically coupling the wavelength division multiplexed light from said secondary branching connection branches.

8. The wavelength division demultiplexing apparatus as claimed in claim 7, wherein each of said branching connection branches has a width with which higher-order mode light of the wavelength division multiplexed light inputted thereto is cut off, and a coupling contact at said merging portion is formed with a width with which the higher-order mode light of the wavelength division multiplexed light inputted thereto can be excited.

9. The wavelength division demultiplexing apparatus as claimed in claim 7, wherein each of said branching connection branches is formed with a width which decreases in a tapering fashion from a portion thereof adjacent said merging portion toward said first slab.

10. The wavelength division demultiplexing apparatus as claimed in claim 8, wherein each of said branching connection branches is formed with a width which decreases in a tapering fashion from a portion thereof adjacent said merging portion toward said first slab.

11. The wavelength division demultiplexing apparatus as claimed in claim 7, wherein each of said branching connection branches has a tapering portion having a width which decreases in a tapering fashion from a portion thereof adjacent said merging portion toward said first slab and a fixed small width waveguide having a substantially fixed width substantially equal to the width of said tapering portion at a position at which said tapering portion has the smallest width for optically connecting said first slab and said tapering portion to each other.

12. The wavelength division demultiplexing apparatus as claimed in claim 8, wherein each of said branching connection branches has a tapering portion having a width which decreases in a tapering fashion from a portion thereof adjacent said merging portion toward said first slab and a fixed small width waveguide having a substantially fixed width substantially equal to the width of said tapering portion at a position at which said tapering portion has the smallest width for optically connecting said first slab and said tapering portion to each other.

13. A wavelength division demultiplexing apparatus, comprising:

a substrate;

a first waveguide, disposed on said substrate, for propagating wavelength division multiplexed light having a plurality of wavelength components;

a first slab, disposed on said substrate, for diffusing the wavelength division multiplexed light inputted from said first waveguide;

a plurality of channel waveguides, disposed on said substrate and having a series of different waveguide lengths increasing with a predetermined difference, for receiving and splitting the wavelength division multiplexed light diffused in said first slab to propagate split light, separately from each other channel waveguide;

a second slab, disposed on said substrate, for receiving the split light separately propagated through the plural channel waveguides and condensing the received wavelength division multiplexed light; and a second waveguide, disposed on said substrate, for propagating the light condensed by said second slab therein;

each of said channel waveguides being formed such that a node thereof to said first slab has a width with which higher-order mode light of the separated light can be excited and the width thereof decreases in a tapering fashion away from said first slab;

an island-shaped formation region of a reflection index lower than that of said channel waveguides being provided for each of said channel waveguides in such a manner as to partition the channel waveguide in the proximity thereof at which the channel waveguide is optically connected to said first slab into a plurality of waveguide portions.

14. The wavelength division demultiplexing apparatus as claimed in claim 13, wherein each of the waveguide portions of each of said channel waveguides partitioned by said island-shaped region is formed as a waveguide by which higher-order mode light of the wavelength division multiplexed light inputted thereto is cut off, and the waveguide width at a portion at which the partitioned waveguide portions are coupled to each other has a width with which the higher-order mode light of the distributed light inputted thereto can be excited.

15. The wavelength division demultiplexing apparatus as claimed in claim 1, wherein a boundary interface of said first slab to each of said channel waveguides is formed in an arc centered at the center of diffusion of the light diffused in and inputted from said first slab to said boundary interface.

16. The wavelength division demultiplexing apparatus as claimed in claim 2, wherein a boundary interface of said first slab to each of said channel waveguides is formed in an arc centered at the center of diffusion of the light diffused in and inputted from said first slab to said boundary interface.

17. The wavelength division demultiplexing apparatus as claimed in claim 7, wherein a boundary interface of said first slab to each of said channel waveguides is formed in an arc centered at the center of diffusion of the light diffused in and inputted from said first slab to said boundary interface.

18. The wavelength division demultiplexing apparatus as claimed in claim 13, wherein a boundary interface of said first slab to each of said channel waveguides is formed in an arc centered at the center of diffusion of the light diffused in and inputted from said first slab to said boundary interface.

19. The wavelength division demultiplexing apparatus as claimed in claim 15, wherein each of said channel waveguides in the proximity of a portion at which the channel waveguide is optically connected to said first slab has a center axis disposed on an extension line from the center of diffusion.

20. The wavelength division demultiplexing apparatus as claimed in claim 16, wherein each of said channel waveguides in the proximity of a portion at which the channel waveguide is optically connected to said first slab has a center axis disposed on an extension line from the center of diffusion.

21. The wavelength division demultiplexing apparatus as claimed in claim 17, wherein each of said channel waveguides in the proximity of a portion at which the channel waveguide is optically connected to said first slab has a center axis disposed on an extension line from the center of diffusion.

22. The wavelength division demultiplexing apparatus as claimed in claim 18, wherein each of said channel waveguides in the proximity of a portion at which the channel waveguide is optically connected to said first slab has a center axis disposed on an extension line from the center of diffusion.

23. The wavelength division demultiplexing apparatus as claimed in claim 2, wherein a boundary interface of said first slab to each of said channel waveguides is formed in an arc centered at the center of diffusion of the light diffused in and inputted from said first slab to said boundary interface, and each of said branches or waveguides through core has a center axis disposed on an extension line from the center of diffusion.

24. The wavelength division demultiplexing apparatus as claimed in claim 8, wherein a boundary interface of said first slab to each of said channel waveguides is formed in an arc centered at the center of diffusion of the light diffused in and inputted from said first slab to said boundary interface, and each of said primary branching connection branches has a center axis disposed on an extension line from the center of diffusion.

25. A wavelength division demultiplexing apparatus, comprising:
a substrate;
a first waveguide, disposed on said substrate, for propagating wavelength division multiplexed light having a plurality of wavelength components;
a first slab, disposed on said substrate, for diffusing the wavelength division multiplexed light inputted from said first waveguide;
a plurality of channel waveguides, disposed on said substrate and having a series of different waveguide lengths increasing with a predetermined difference, for receiving and splitting the wavelength division multiplexed light diffused in said first slab to propagate split light, separately from each other channel waveguide;
a second slab, disposed on said substrate, for receiving the split light separately propagated through the plural channel waveguides and condensing the received wavelength division multiplexed light; and
a second waveguide, disposed on said substrate, for propagating the light condensed by said second slab therein;
each of said channel waveguides including, in the proximity of a portion thereof at which the channel waveguide is optically connected to said first slab, a plurality of coupling waveguides connected in tandem in a plurality of stages in a tree-like configuration for optically coupling and propagating the distributed light inputted thereto.

26. A wavelength division demultiplexing apparatus, comprising:
an input waveguide for guiding and outputting wavelength division multiplexed light having a plurality of light components of different wavelengths;
an input slab for diffusing the wavelength division multiplexed light outputted from said input waveguide;
a plurality of channel waveguides for propagating split light obtained by splitting the wavelength division multiplexed light diffused by said input slab in accordance with the wavelengths, said channel waveguides being formed such that differences in light path length between adjacent ones of said channel waveguides are equal to each other; and
an output slab for condensing the split light components from said channel waveguides.

27. The wavelength division demultiplexing apparatus as claimed in claim 26, wherein the shape of a first slab boundary line along which portions of said channel waveguides are positioned in the proximity of said input slab is an arc having a predetermined radius and centered at a diffusion center provided on said input slab.

28. The wavelength division demultiplexing apparatus as claimed in claim 27, wherein said input slab is formed so as to diffuse and output the wavelength division multiplexed light with the same phase from the diffusion center.

29. The wavelength division demultiplexing apparatus as claimed in claim 26, wherein said channel waveguides are formed so that the split light components may exhibit the phase differences produced based on the differences in light path length.

30. The wavelength division demultiplexing apparatus as claimed in claim 26, wherein said channel waveguides are formed such that the differences in light path length thereof are set to order numbers equal to multiple numbers of times a center wavelength included in the wavelength division multiplexed light.

31. The wavelength division demultiplexing apparatus as claimed in claim 26, wherein the shape of a second slab boundary line along which portions of said channel waveguides are positioned in the proximity of said output slab is an arc having a predetermined radius.

32. The wavelength division demultiplexing apparatus as claimed in claim 31, wherein said output slab condenses the split light components based on wavelengths of the light outputted from the second slab boundary line and a center wavelength included in the wavelength division multiplexed light.

33. The wavelength division demultiplexing apparatus as claimed in claim 26, further comprising a plurality of output waveguides each having at least two terminals one of which is provided at a position at which the light condensed by said output slab is condensed and the other of which is provided so that the light is inputted to another optical module.

34. The wavelength division demultiplexing apparatus as claimed in claim 27, further comprising a plurality of output waveguides each having at least two terminals one of which is provided at a position at which the light condensed by said output slab is condensed and the other of which is provided so that the light is inputted to another optical module.

35. The wavelength division demultiplexing apparatus as claimed in claim 28, further comprising a plurality of output waveguides each having at least two terminals one of which is provided at a position at which the light condensed by said output slab is condensed and the other of which is provided so that the light is inputted to another optical module.

36. The wavelength division demultiplexing apparatus as claimed in claim 29, further comprising a plurality of output waveguides each having at least two terminals one of which is provided at a position at which the light condensed by said output slab is condensed and the other of which is provided so that the light is inputted to another optical module.

37. The wavelength division demultiplexing apparatus as claimed in claim 30, further comprising a plurality of output waveguides each having at least two terminals one of which is provided at a position at which the light condensed by said output slab is condensed and the other of which is provided so that the light is inputted to another optical module.

38. The wavelength division demultiplexing apparatus as claimed in claim 31, further comprising a plurality of output waveguides each having at least two terminals one of which is provided at a position at which the light condensed by said output slab is condensed and the other of which is provided so that the light is inputted to another optical module.

39. The wavelength division demultiplexing apparatus as claimed in claim 32, further comprising a plurality of output waveguides each having at least two terminals one of which is provided at a position at which the light condensed by said output slab is condensed and the other of which is provided so that the light is inputted to another optical module.

\* \* \* \* \*